(12) United States Patent
Yamaguchi et al.

(10) Patent No.: US 8,155,082 B2
(45) Date of Patent: Apr. 10, 2012

(54) MASTER STATION, CANDIDATE FOR MASTER STATION AND METHOD FOR USE IN A COMMUNICATION SYSTEM

(75) Inventors: Tsuyoshi Yamaguchi, Osaka (JP);
Shinichiro Ohmi, Toyono-gun (JP);
Kensuke Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 604 days.

(21) Appl. No.: 12/241,996

(22) Filed: Sep. 30, 2008

(65) Prior Publication Data
US 2009/0034477 A1 Feb. 5, 2009

Related U.S. Application Data

(62) Division of application No. 10/911,673, filed on Aug. 5, 2004, now Pat. No. 7,447,746.

(30) Foreign Application Priority Data

Aug. 6, 2003 (JP) ................. 2003-288091
Mar. 5, 2004 (JP) ................. 2004-062871

(51) Int. Cl.
*G01R 31/08* (2006.01)
*G06F 11/00* (2006.01)
*H04B 15/00* (2006.01)

(52) U.S. Cl. ............ 370/331; 370/229; 455/507
(58) Field of Classification Search .......... 370/331
See application file for complete search history.

(56) References Cited

U.S. PATENT DOCUMENTS

| | | | | |
|---|---|---|---|---|
| 5,677,908 A | * | 10/1997 | Oura ................ | 370/331 |
| 6,243,583 B1 | * | 6/2001 | Tsutsui et al. ........ | 455/442 |
| 6,363,416 B1 | * | 3/2002 | Naeimi et al. ........ | 709/209 |
| 6,834,192 B1 | | 12/2004 | Watanabe et al. | |
| 6,879,574 B2 | | 4/2005 | Naghian | |
| 6,973,306 B2 | | 12/2005 | Kim | |
| 7,193,991 B2 | * | 3/2007 | Melpignano et al. .... | 370/352 |
| 7,222,166 B2 | * | 5/2007 | Treister et al. ........ | 709/223 |
| 2003/0124979 A1 | * | 7/2003 | Tanada et al. ......... | 455/41 |

FOREIGN PATENT DOCUMENTS

| | | |
|---|---|---|
| EP | 1 244 326 | 9/2002 |
| EP | 1 289 199 | 3/2003 |
| EP | 1 324 540 | 7/2003 |
| JP | 11-008585 | 1/1999 |
| JP | 2001-505035 | 4/2001 |
| JP | 2003-134124 | 5/2003 |
| WO | 00/69186 | 11/2000 |

OTHER PUBLICATIONS

Written opinion of the International Searching Authority issued in PCT/JP2004/011521 on Nov. 17, 2004, 8 pages. B. J. Prabhu et al., "A Routing Protocol and Energy Efficient Techniques in Bluetooth Scatternets", 2002 IEEE International Conference on Communications. Conference Proceedings. New York, NY, Apr. 28, 2002, pp. 3336-3340.

* cited by examiner

*Primary Examiner* — Jeffrey Pwu
*Assistant Examiner* — Shaq Taha
(74) *Attorney, Agent, or Firm* — Wenderoth, Lind & Ponack, L.L.P.

(57) ABSTRACT

Terminal devices F and G store statistical information related to interference from an external communication system, and notify the stored statistical information to a master station E. The master station E determines the terminal device G as a candidate station for a master station capability handover destination based on collected statistical information. The master station E requests to hand over a master station capability to the terminal device G. If it is determined that the terminal device G accepts handover of the master station capability, the terminal device G starts to act as the master station.

4 Claims, 21 Drawing Sheets

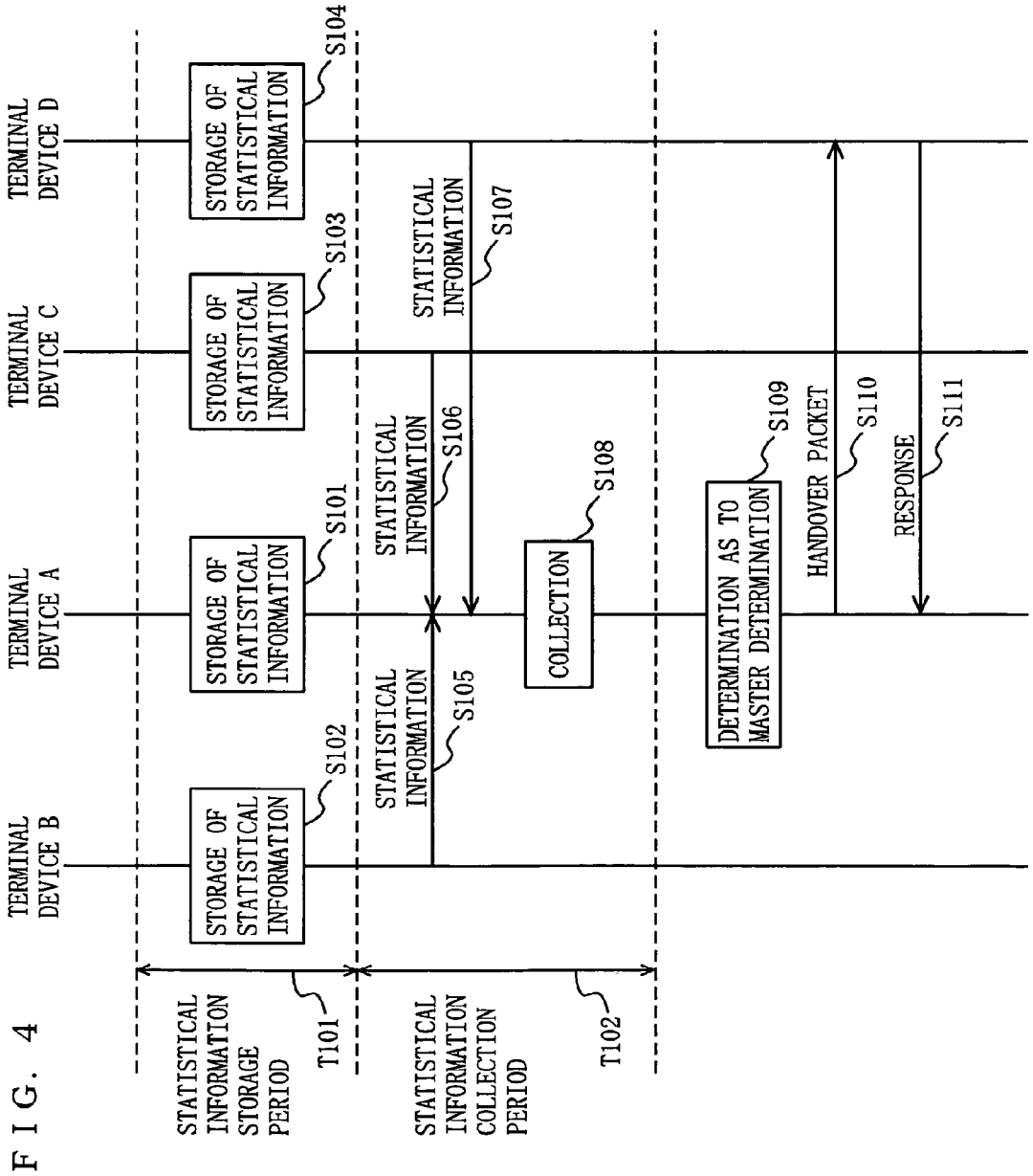

FIG. 5

| TERMINAL DEVICE | RECEPTION INTENSITY AVERAGES AND TERMINAL DEVICES | | TRANSMISSION ACCEPTING TERMINAL DEVICES | |
|---|---|---|---|---|
| | SOURCE TERMINAL DEVICES | RECEPTION INTENSITY AVERAGES | DESTINATION TERMINAL DEVICES | PRESENCE/ ABSENCE OF ACK |
| B | A | 10 | A | ○ |
| | C | 0 | C | × |
| | D | 50 | D | ○ |

FIG. 6

| TERMINAL DEVICE | RECEPTION INTENSITY AVERAGES AND TERMINAL DEVICES | | TRANSMISSION ACCEPTING TERMINAL DEVICES | |
|---|---|---|---|---|
| | SOURCE TERMINAL DEVICES | RECEPTION INTENSITY AVERAGES | DESTINATION TERMINAL DEVICES | PRESENCE/ ABSENCE OF ACK |
| A | B | 15 | B | ○ |
| | C | 30 | C | ○ |
| | D | 40 | D | ○ |
| B | A | 10 | A | ○ |
| | C | 0 | C | × |
| | D | 50 | D | ○ |
| C | A | 45 | A | ○ |
| | B | 10 | B | × |
| | D | 45 | D | ○ |
| D | A | 30 | A | ○ |
| | B | 30 | B | ○ |
| | C | 50 | C | ○ |

FIG. 9

| TERMINAL DEVICE | RECEPTION INTENSITY AVERAGES AND TERMINAL DEVICES | | |
| --- | --- | --- | --- |
| | SOURCE TERMINAL DEVICES | RECEPTION INTENSITY AVERAGES | NUMBER OF RECEPTIONS |
| G | X | 35 | 2 |
| | Y | 15 | 2 |

FIG. 10

| TERMINAL DEVICE | RECEPTION INTENSITY AVERAGES AND TERMINAL DEVICES | | |
| --- | --- | --- | --- |
| | SOURCE TERMINAL DEVICES | RECEPTION INTENSITY AVERAGES | NUMBER OF RECEPTIONS |
| G | X | 35 | 2 |
| | Y | 15 | 2 |
| E | ... | ... | ... |
| F | X | 20 | 2 |

F I G. 1 1
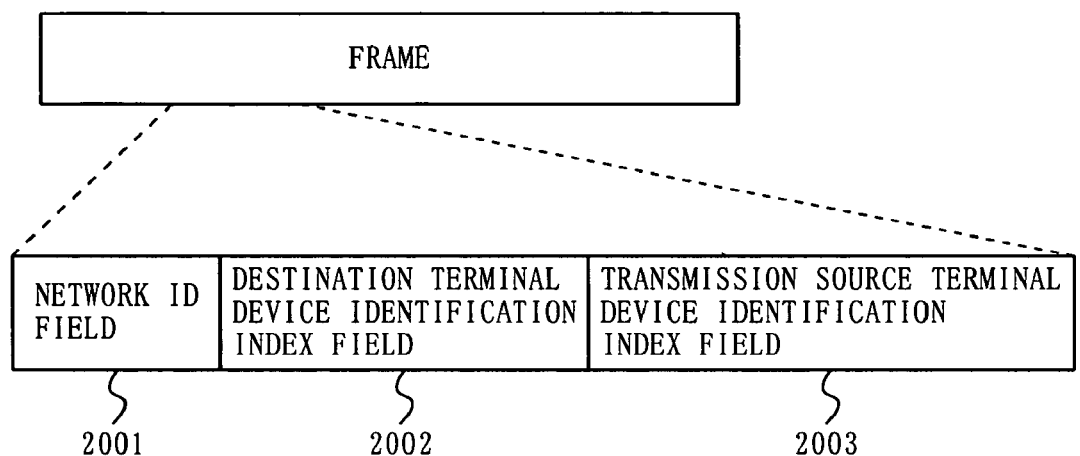

FIG. 13

| ITEMS | CONTROL INFORMATION | NETWORK ID | RECEPTION TERMINAL NUMBER | AVERAGE SIGNAL AMPLIFICATION FACTOR | DIRECTED FRAME NUMBER |
|---|---|---|---|---|---|
| | CTR | ADR | NRS | SAR | NLP |
| SIZE | 10ctets | 60ctets | 10ctets | 40ctets | 40ctets |
| PARAMETERS | ... | ... | ... | ... | ... |
| | 3001 | 3002 | 3003 | 3004 | 3005 |

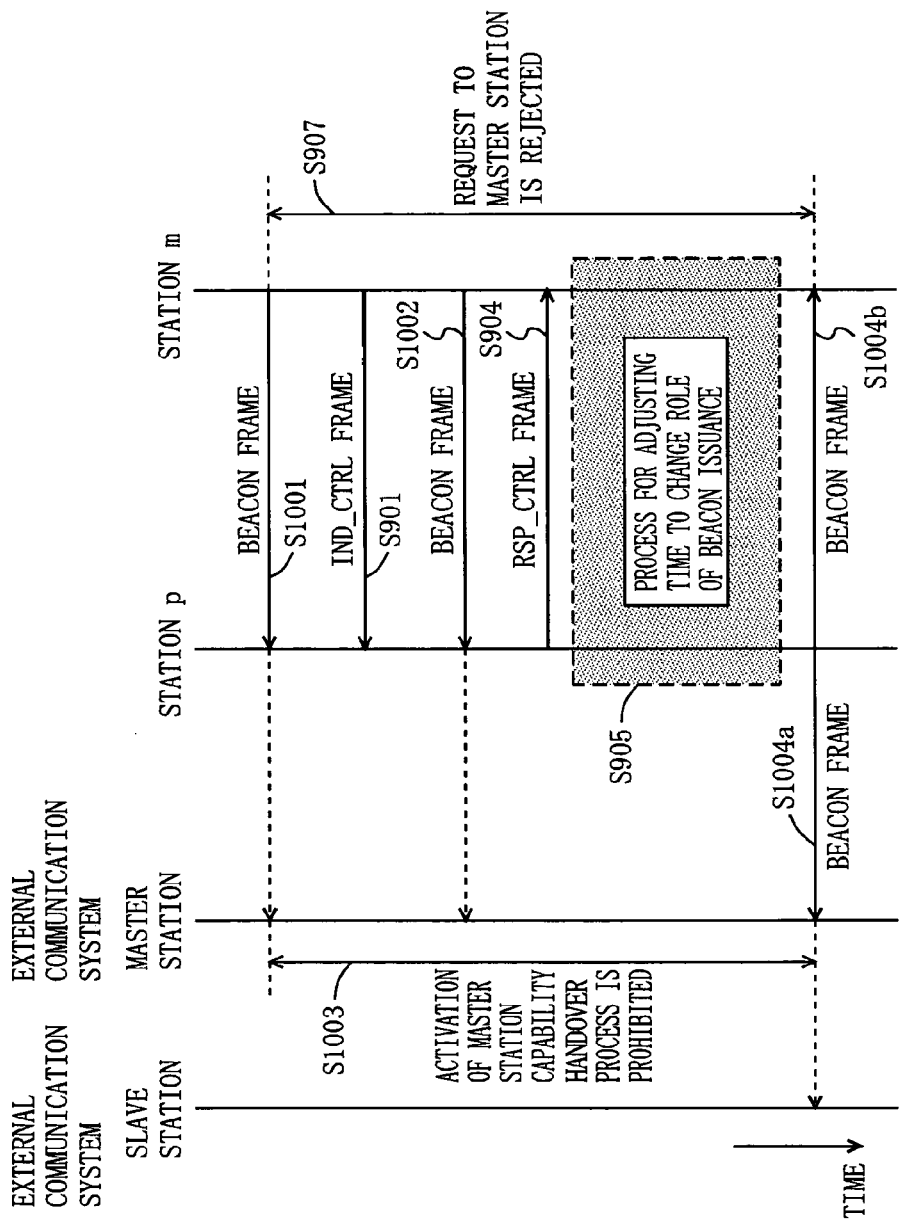

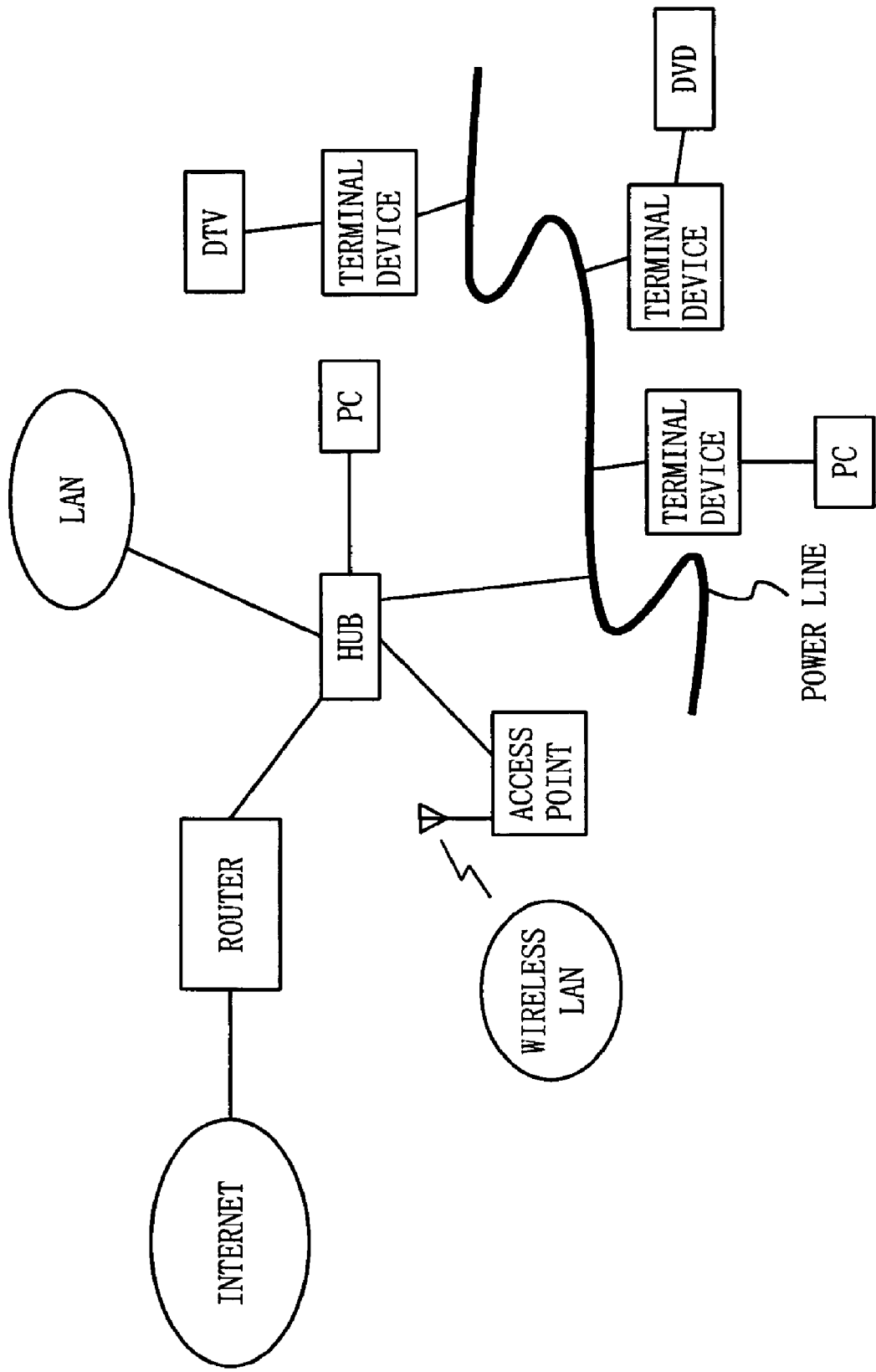

MASTER STATION, CANDIDATE FOR MASTER STATION AND METHOD FOR USE IN A COMMUNICATION SYSTEM

This application is a divisional of Ser. No. 10/911,673, filed Aug. 5, 2004 now U.S. Pat. No. 7,447,746.

BACKGROUND OF THE INVENTION

1. Field of the Invention

The present invention relates to a terminal device and a method for use in a communication system in which a plurality of terminal devices communicate with each other, and more particularly, to a terminal device and a method for use in a communication system in which at least one of a plurality of terminal devices is a master station for controlling communication in the communication system.

2. Description of the Related Art

A communication system, where each terminal device uses a common communication medium, requires a communication protocol capable of realizing effective and satisfactory communication efficiency.

Conventionally, in the communication system, where each terminal device uses a common communication medium, a contention protocol is essentially used. A terminal device which uses the contention protocol verifies that no signal from another terminal device is present on the communication medium, and then starts signal transmission. However, if the number of terminal devices or network traffic is increased, there may be an increase in the number of terminal devices which simultaneously start signal transmission resulting in an increase of a packet collision rate. Thus, in the contention protocol network use efficiency is limited.

Accordingly, a centralized control protocol has been developed with the intention of promoting efficiency in an entire network by providing a master station for controlling access of a terminal device on the communication system to another terminal device. In the communication system using the centralized control protocol, a terminal device acting as the master station controls signal transmission and reception between terminal devices on the communication system. In the centralized control protocol, for example, only a terminal device to which transmission right is granted by the master station is allowed to transmit a signal.

However, in the case where communication quality on the communication medium varies among locations, the quality of communication between the master station and a slave station depends on a physical positional relationship between the master and the slave station. Accordingly, the physical positional relationship between the master station and the slave station has a considerable influence on communication efficiency on a communication network. Thus, there has been developed a centralized control protocol capable of optimizing the communication efficiency by selecting a master station, which is able to provide optimum communication quality to each slave station, from among a plurality of master stations whose physical location is fixed (see, for example, Japanese National Phase PCT Laid-Open Publication No. 2001-505035).

However, in a home network or the like, it is difficult to place the master station in a physically fixed location. In some cases, it is also difficult to place the master station in such a location as to optimize the communication efficiency. Accordingly, in the conventional centralized control protocol, the communication efficiency cannot necessarily be optimized.

Moreover, in the case where a communication system is provided adjacent to an external communication system using a common frequency band, signal interference occurs between the communication systems. Such interference by an external communication system is referred to as "external interference". If the master station is not aware of the external interference, the master station is not able to control communication based on degradation of the communication quality due to the external interference. Particularly, if a power line is used as the communication medium, there may be cases where a signal leaks from, for example, an adjacent house, and therefore the external interference (interference between adjacent houses) is considerable.

SUMMARY OF THE INVENTION

Therefore, an object of the present invention is to provide a terminal device and a method which enable selection of a master station capable of optimizing the communication quality under the occurrence of external interference.

To solve problems as described above, the present invention has the following features. The present invention is directed to a terminal device for use in a communication system in which a master station controls access of slave stations to a communication medium. The communication system is provided adjacent to an external communication system, wherein the terminal device includes: master and slave station management means for managing whether the terminal device should act as the master station or as a slave station; communication status information storage means for, if the terminal device is managed by the master and slave station management means so as to act as the slave station, storing, as communication status information, information related to a communication status in the external communication system; communication status information notification means for, if the terminal device is managed by the master and slave station management means so as to act as the slave station, notifying the communication status information stored in the communication status information storage means to the master station in the communication system; communication status information collection means for, if the terminal device is managed by the master and slave station management means so as to act as the master station, collecting the communication status information from the slave stations in the communication system; master station capability handover destination station determination means for, if the terminal device is managed by the master and slave station management means so as to act as the master station, referring to the communication status information collected by the communication status information collection means and determining, from among slave stations in the communication system having notified the communication status information, a slave station, which satisfies a predetermined handover requirement, as a candidate for a master station capability handover destination station to which a master station capability is entirely or partially handed over; and master station capability handover request means for, if the terminal device is managed by the master and slave station management means so as to act as the master station, requesting a handover of the master station capability to the candidate for the master station capability handover destination station determined by the master station capability handover destination station determination means, Wherein in a state where the terminal device is managed so as to act as the slave station, if the master station in the communication system requests the handover of the master station capability, the master and slave station management means determines whether the terminal device satisfies a master station predetermined requirement. If the predetermined master station requirement is satisfied, the master and slave station management means changes a management detail such that the terminal device acts as the master station.

Preferably, the communication status information may be interference information related to a signal received from the external communication system.

Preferably, the terminal device may further include master station capability handover start notification means for, if the master and slave station management means determines that the terminal device should act as the master station, and starts a change of the management detail, notifying the external communication system that handover of the master station capability has started.

For example, the master station capability handover start notification means may notify the handover of the master station capability by describing in a specific region of a broadcast beacon frame that handover of the master station capability has started.

Preferably, the master station capability handover start notification means may notify the external communication system that handover of the master station capability has started, to prohibit a handover process of the master station capability from being performed in the external communication system.

Preferably, the terminal device may further include master station capability handover completion notification means for, if the master and slave station management means determines that the terminal device should act as the master station, and completes the change of the management detail, notifying the external communication system that the handover of the master station capability has been completed.

For example, the master station capability handover completion notification means may notify completion of the handover of the master station capability by describing in a specific region of a broadcast beacon frame that the handover of the master station capability has been completed.

Preferably, the master station capability handover start notification means may notify the external communication system that handover of the master station capability has started, to prohibit a handover process of the master station capability from being performed in the external communication system. The master station capability handover start notification means may notify the external communication system that the handover of the master station capability has been completed, to cancel prohibition of the handover process of the master station capability in the external communication system.

For example, the interference information may be information related to received signal intensities of the signals received from the external communication system. The interference information may be information related to the number of signals received from the external communication system. The interference information may be information related to the number of source terminal devices of the signals received from the external communication system.

Also, if a terminal device in the external communication system detects a frame transmitted from the terminal device in the communication system, the terminal device in the external communication system may notify information related to a reception signal intensity of the frame to the terminal device in the communication system having transmitted the frame. In this case, the communication status information may be information related to the reception signal intensity notified by the external communication system.

Preferably, the master station capability handover destination station determination means may determine the master station capability handover destination station based on a number of retransmissions of a frame transmitted from the slave station. The master station capability handover destination station determination means may determine the master station capability handover destination station based on a signal amplification factor of a signal received by the slave station. The master station capability handover destination station determination means may determine the master station capability handover destination station based on a type of a frame received by the slave station. The master station capability handover destination station determination means may determine the master station capability handover destination station based on a number of frames received by the slave station.

Preferably, the master station capability handover request means may request the handover of the master station capability by transmitting a request frame for requesting the handover of the master station capability to the candidate for the master station capability handover destination station.

Preferably, the terminal device may further include response frame transmission means for, if the master and slave station management means determines that the predetermined master station requirement is satisfied, transmitting a response frame, which indicates that the handover of the master station capability has been accepted, to the master station.

Preferably, the response frame transmission means may transmit the response frame which describes information related to time to hand over the master station capability.

Also, the present invention is directed to a terminal device for use in a communication system in which a master station controls access of slave stations to a communication medium, wherein the communication system is provided adjacent to an external communication system and each of the slave stations has stored therein information related to a communication status in the external communication system as communication status information. The terminal device includes: communication status information collection means for collecting the communication status information from the slave stations in the communication system; master station capability implementation station determination means for referring to the communication status information collected by the communication status information collection means and selecting, from among slave stations in the communication system having notified the communication status information, a slave station, which satisfies a predetermined handover requirement, as a candidate station for entirely or partially implementing a master station capability; and master station capability implementation request means for requesting the candidate station determined by the master station capability implementation station determination means to implement the master station capability.

Also, the present invention is directed to a method for entirely or partially handing over a master station capability to a slave station in a communication system in which a master station controls access of slave stations to a communication medium, where the communication system is provided adjacent to an external communication system, and each terminal device on the communication system is operable to act as the master or slave station. The method includes the steps of: causing a terminal device acting as the slave station to store, as communication status information, information related to a communication status in the external communication system; causing the terminal device acting as the slave station to notify the communication status information stored therein to the master station in the communication system; causing a terminal device acting as the master station to collect the communication status information from the slave stations in the communication system; causing the terminal device acting as the master station to refer to the communication status information collected by the communication status information collection means and to determine, from among slave stations in the communication system having notified the communication status information, a slave station, which satisfies a predetermined handover requirement, as a candidate for a master station capability handover destination station to which a master station capability is entirely or partially handed over; causing the terminal device acting as the master station to request a handover of the master station capability from the candidate; determining whether the candidate satisfies a predetermined master station requirement; and if the predetermined master station requirement is satisfied, causing the candidate to act as the master station.

Also, the present invention is directed to a program for causing a computer apparatus, which is used in a communication system in which a master station controls access of slave stations to a communication medium, to entirely or partially hand over a master station capability to a slave station. The communication system is provided adjacent to an external communication system, and each terminal device on the communication system is operable to act as the master or slave station. The program includes the steps of: causing a terminal device acting as the slave station to store, as communication status information, information related to a communication status in the external communication system; causing the terminal device acting as the slave station to notify the communication status information stored therein to the master station in the communication system; causing a terminal device acting as the master station to collect the communication status information from the slave stations in the communication system; causing the terminal device acting as the master station to refer to the communication status information collected by the communication status information collection means and to determine, from among slave stations in the communication system having notified the communication status information, a slave station, which satisfies a predetermined handover requirement, as a candidate for a master station capability handover destination station to which a master station capability is entirely or partially handed over; causing the terminal device acting as the master station to request a handover of the master station capability from the candidate; determining whether the candidate satisfies a predetermined master station requirement; and if the predetermined master station requirement is satisfied, causing the candidate to act as the master station.

Also, the present invention is directed to a communication system in which a master station controls access of slave stations to a communication medium. The communication system is provided adjacent to an external communication system. The terminal device includes: master and slave station management means for managing whether the terminal device should act as the master station or as a slave station; communication status information storage means for, if the terminal device is managed by the master and slave station management means so as to act as the slave station, storing, as communication status information, information related to a communication status in the external communication system; communication status information notification means for, if the terminal device is managed by the master and slave station management means so as to act as the slave station, notifying the communication status information stored in the communication status information storage means to the master station in the communication system; communication status information collection means for, if the terminal device is managed by the master and slave station management means so as to act as the master station, collecting the communication status information from the slave stations in the communication system; master station capability handover destination station determination means for, if the terminal device is managed by the master and slave station management means so as to act as the master station, referring to the communication status information collected by the communication status information collection means and determining, from among slave stations in the communication system having notified the communication status information, a slave station, which satisfies a predetermined handover requirement, as a candidate for a master station capability handover destination station to which a master station capability is entirely or partially handed over; and master station capability handover request means for, if the terminal device is managed by the master and slave station management means so as to act as the master station, requesting a handover of the master station capability to the candidate for the master station capability handover destination station determined by the master station capability handover destination station determination means, wherein in a state where the terminal device is managed so as to act as the slave station, if the master station in the communication system requests the handover of the master station capability, the master and slave station management means determines whether the terminal device satisfies a master station predetermined requirement, and if the predetermined master station requirement is satisfied, the master and slave station management means changes a management detail such that the terminal device acts as the master station.

Also, the present invention is directed to an integrated circuit in a terminal device for use in a communication system in which a master station controls access of slave stations to a communication medium. The communication system is provided adjacent to an external communication system. The integrated circuit includes: master and slave station management means for managing whether the terminal device should act as the master station or as a slave station; communication status information storage means for, if the terminal device is managed by the master and slave station management means so as to act as the slave station, storing, as communication status information, information related to a communication status in the external communication system; communication status information notification means for, if the terminal device is managed by the master and slave station management means so as to act as the slave station, notifying the communication status information stored in the communication status information storage means to the master station in the communication system; communication status information collection means for, if the terminal device is managed by the master and slave station management means so as to act as the master station, collecting the communication status information from the slave stations in the communication system; master station capability handover destination station determination means for, if the terminal device is managed by the master and slave station management means so as to act as the master station, referring to the communication status information collected by the communication status information collection means and determining, from among slave stations in the communication system having notified the communication status information, a slave station, which satisfies a predetermined handover requirement, as a candidate for a master station capability handover destination station to which a master station capability is entirely or partially handed over; and master station capability handover request means for, if the terminal device is managed by the master and slave station management means so as to act as the master station, requesting a handover of the master station capability to the candidate for the master station capability handover destination station determined by the master station capability handover destination station determination means, wherein in a state where the terminal device is managed so as to act as the slave station, if the master station in the communication system requests the handover of the master station capability, the master and slave station management means determines whether the terminal device satisfies a master station predetermined requirement, and if the predetermined master station requirement is satisfied, the master and slave station management means changes a management detail such that the terminal device acts as the master station.

In the present invention, an optimum master station is determined with consideration of influence from an external communication system, and a master station capability is handed over to the optimum master station. Therefore, it is possible to select a master station capable of optimizing the communication quality under the occurrence of the external interference. Thus, it is possible to select a master station capable of readily avoiding a problem due to the external interference.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a sequence diagram showing a flow of a master station capability handover process;

FIG. 5 is a table showing exemplary statistical information in a terminal device B;

FIG. 6 is a table showing exemplary collected statistical information;

FIG. 9 is a table showing exemplary statistical information stored in a terminal device G;

FIG. 10 is a table showing exemplary statistical information collected by a master station E;

FIG. 11 is a diagram showing a structure of a frame transmitted by a terminal device in a communication system according to the second embodiment;

FIG. 13 is a table showing an exemplary data structure of the statistical information;

FIG. 22 is a sequence diagram showing a flow of a process which can be implemented instead of implementing the process shown in FIG. 21; and FIG. 23 is a diagram illustrating the overall structure of a system in the case where the terminal device of the present invention is applied to a high-speed power line transmission.

DETAILED DESCRIPTION OF THE INVENTION (First Embodiment)

Figure 1:
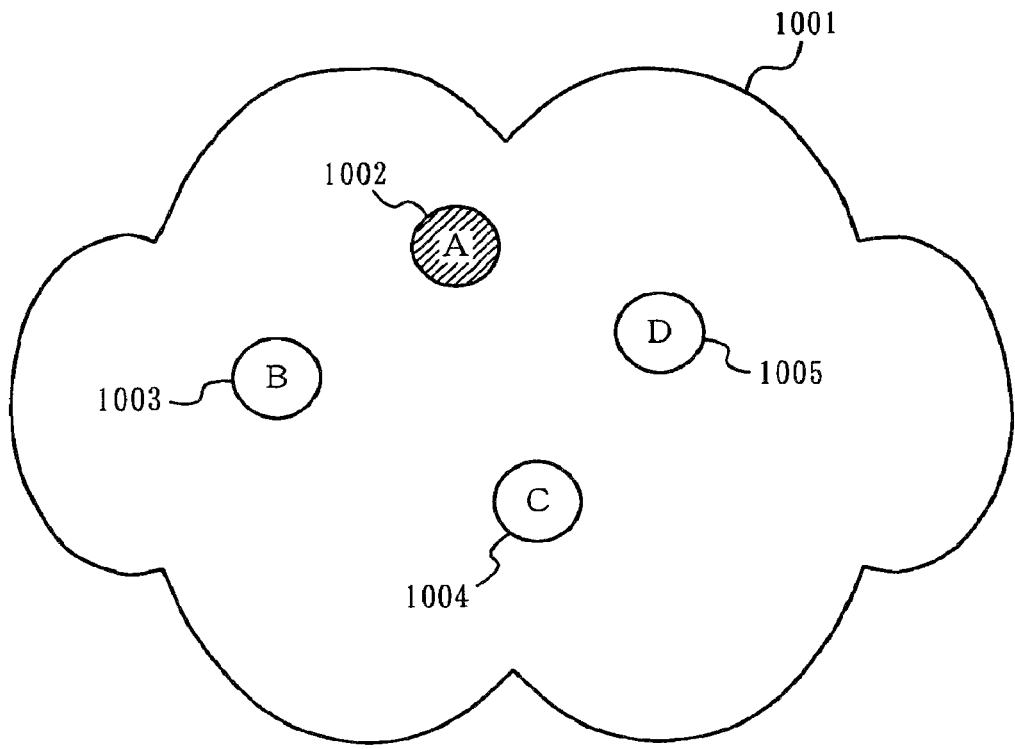
FIG. 1 is a diagram schematically showing a structure of a communication system according to a first embodiment of the present invention.

FIG. 1 is a diagram schematically showing a structure of a communication system 1001 according to a first embodiment of the present invention. In FIG. 1, the communication system 1001 includes terminal devices 1002 through 1005. Note that although four terminal devices are shown in FIG. 1, the number of terminal devices may be less than or equal to three or may be equal to or more than five.

In the communication system 1001, the terminal device 1002 (hereinafter, referred to as a "terminal device A") is a master station operable to transmit a signal to control an availability of an opportunity for another terminal device to access a communication medium (hereinafter, referred to by the term "media access"). The terminal device 1003 (hereinafter, referred to as a "terminal device B"), the terminal device 1004 (hereinafter, referred to as a "terminal device C"), and the terminal device 1005 (hereinafter, referred to as a "terminal device D") are slave stations. In the present embodiment, each slave station is able to act as a master station. Specifically, in the case where the current master station requests a master station capability to be entirely or partially handed over to a slave station, if the slave station satisfies a predetermined master station requirement, the slave station takes over the functions of the master station.

The master station has a scheduling capability for, in response to a bandwidth reservation request from a slave station, allocating a bandwidth to the slave station with consideration of a bandwidth resource which can be used in the communication system. Moreover, the master station has a capability of regularly broadcasting, as system information, information related to a time to start the communication medium being occupied between terminal devices, an occupation period, and a time to start a contention period.

Each slave station obtains a bandwidth allocated thereto, a communication medium occupation start time, etc., based on a signal transmitted from the master station, and transmits a signal based on the obtained information. Accordingly, unless a packet is correctly delivered from the master station to the slave station, the system information is not correctly delivered to the slave station, and unless a packet is correctly delivered from the slave station to the master station, the bandwidth reservation request is not correctly delivered to the master station, deteriorating communication quality in the communication system. Therefore, the master station is required to be placed in an optimum physical location at which satisfactory communication quality can be maintained with each terminal device.

Figure 2:
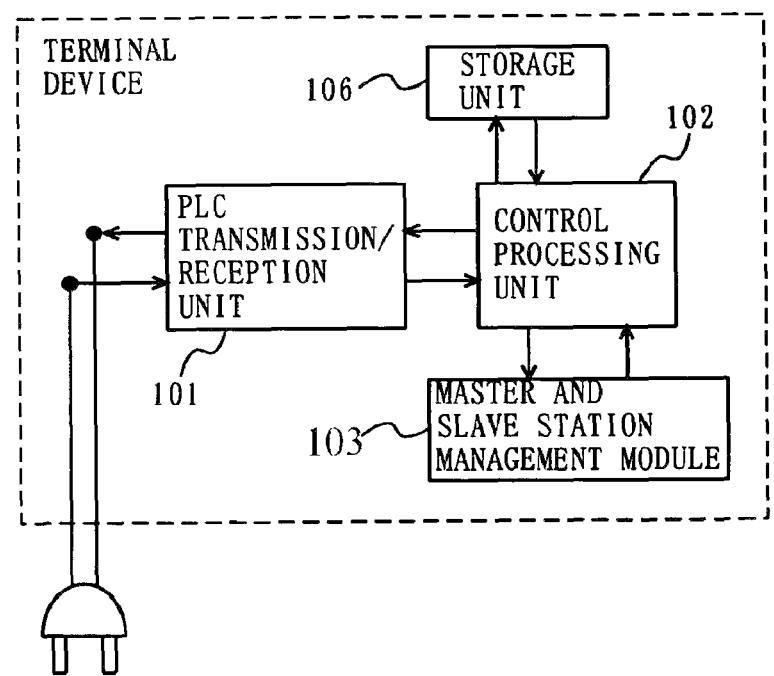
FIG. 2 is a block diagram showing a functional structure of a terminal device on the communication system.

FIG. 2 is a block diagram showing a functional structure of a terminal device on the communication system 1001. In FIG. 2, a functional structure in the case of using a power line as the communication medium is shown. In FIG. 2, the terminal device includes: a power line communication (PLC) transmission/reception unit 101; a control processing unit 102; a master and slave station management module 103; and a storage unit 106.

The PLC transmission/reception unit 101 is operable to demodulate a signal transmitted via a power line and to transmit the demodulated signal to the control processing unit 102, while the PLC transmission/reception unit 101 is operable to modulate a signal from the control processing unit 102 and to transmit the modulated signal to the power line.

The master and slave station management module 103 is operable to manage operation modes which indicate whether the terminal device should act as the master station or the slave station The available operation modes are a master station mode in which the terminal device acts as the master station, and a slave station mode in which the terminal device acts as the slave station. The master and slave station management module 103 determines whether to cause the terminal device to act as the master station or the slave station, based on an instruction from the control processing unit 102, and switches between the operation modes.

Whether the terminal device operates as the master station or the slave station is managed by the master and slave station management module 103. The master and slave station management module 103 prepares a one-bit writable storage region which can be accessed by the control processing unit 102. If it is determined to operate the terminal device as the master station, the master and slave station management module 103 stores a value of "1" in the one-bit writable storage region, while if it is determined to operate as the slave station, the master and slave station management module 103 stores a value of "0" in the one-bit writable storage region. The control processing unit 102 refers to the one-bit writable storage region and causes the terminal device to operate as the master station in the case of "1" and as the slave station in the case of "0".

The storage unit 106 is operable to store statistical information. The statistical information will be described later.

The control processing unit 102 is operable to interpret a frame received by the PLC transmission/reception unit 101. If the frame is a control frame used for control within the communication system, the control processing unit 102 implements a suitable process. If the frame is related to a change of the operation mode, the control processing unit 102 instructs the master and slave station management module 103 to determine whether the terminal device should act as the master station or the slave station.

Note that the terminal device may include a host CPU interface unit between the control processing unit 102 and an upper layer in a communication protocol hierarchy. The host CPU interface unit has a capability for exchanging data between the upper layer and the control processing unit 102. The host CPU interface unit exchanges data with an upper layer in a network hierarchy via a bus. The host CPU interface unit includes, for example, an IP stack and a UPnP (R) module. Accordingly, the terminal device is able to use a UPnP (R) protocol to automatically secure a bandwidth between links within a power line network. The terminal device can be used as a host terminal device by connecting the host CPU interface unit to a specialized application.

Note that the terminal device may include an Ethernet (R) interface unit having a capability for exchanging data between the control processing unit 102 and an Ethernet network. Alternatively, the terminal device may include a radio communication module, a HomePNA module, or a coaxial cable communication module, instead of including the Ethernet® interface unit. Alternatively still, any combination of the Ethernet® interface unit, the radio communication module, the HomePNA module, and the coaxial cable communication module may be used.

In the case where the terminal device includes the host CPU interface unit or the Ethernet® interface unit, the control processing unit 102 bridges a frame to the host CPU interface unit 104 or the Ethernet® interface unit 105 in accordance with the type of the frame.

Figure 3A:
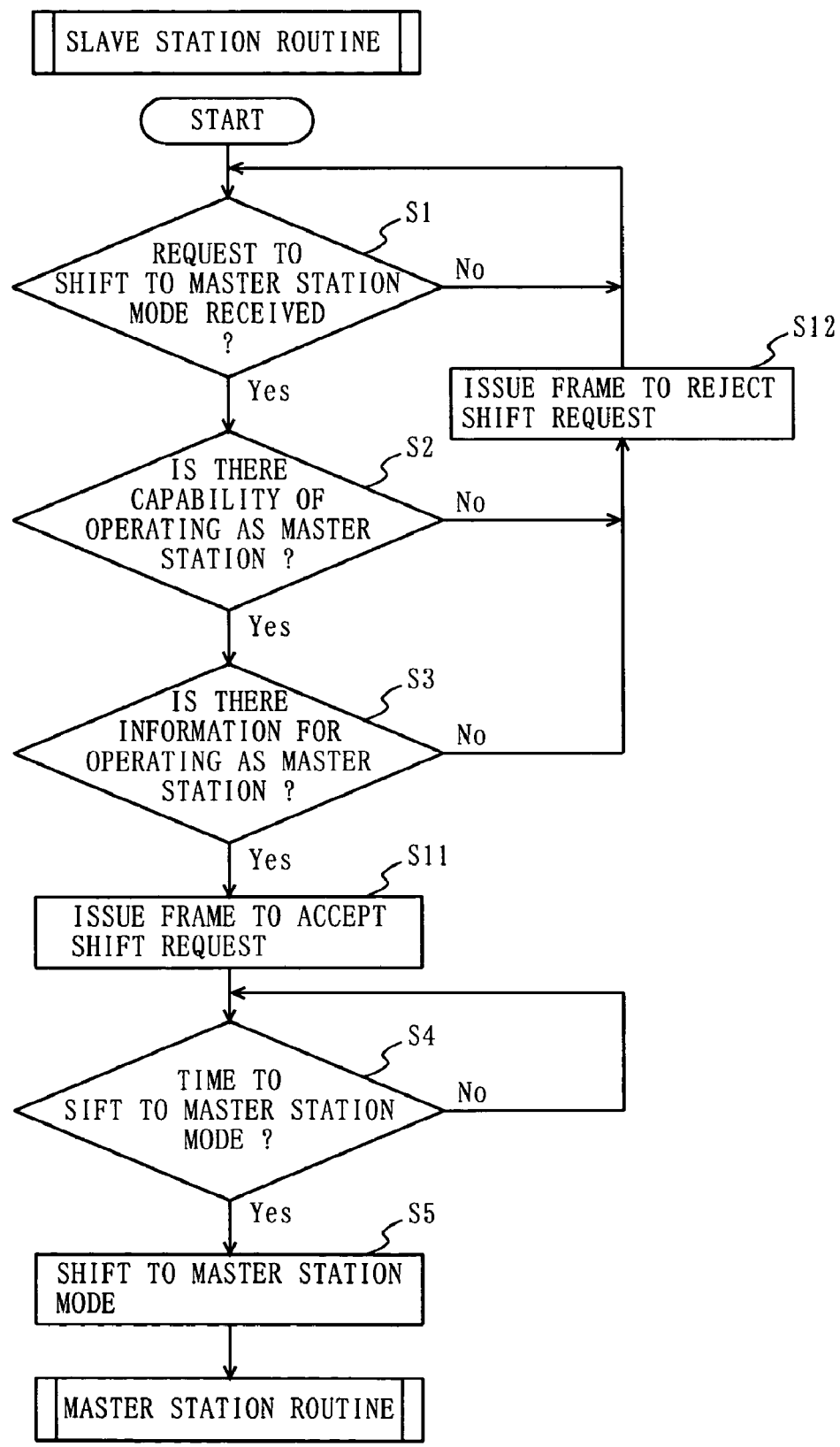
FIG. 3A is a flowchart showing a flow of a process (a slave station routine) in a master and slave station management module in the case where the terminal device is acting as a slave station.

FIG. 3A is a flowchart showing a flow of a process (a slave station routine) in the master and slave station management module 103 in the case where the terminal device is acting as the slave station. The flow of the process (the slave station routine) in the master and slave station management module 103 in the case where the terminal device is acting as the slave station is described below with reference to FIG. 3A.

Firstly, the master and slave station management module 103 determines whether a shift request to shift to the master station mode has been received from another terminal device (step S1). If the shift request has not been received, the master and slave station management module 103 returns to the operation of step S1. On the other hand, if the shift request has been received, the master and slave station management module 103 determines whether the terminal device has a capability of operating as the master station (step S2).

If the terminal device does not have the capability of operating as the master station, the master and slave station management module 103 proceeds to an operation of step S12. On the other hand, if the terminal device has the capability of operating as the master station, the master and slave station management module 103 determines whether the terminal device has information for allowing it to be activated as the master station (step S3).

If the terminal device does not have the information for allowing it to be activated as the master station, the master and slave station management module 103 proceeds to an operation of step S12. On the other hand, if the terminal device has the information for allowing itself to be activated as the master station, the master and slave station management module 103 issues a frame indicating acceptance of the shift and information related to time of the shift, and causes the control processing unit 102 to transmit the issued frame to the current master station (step S11). The master and slave station management module 103 then determines whether it is the time to shift to the master station mode (step S4).

In step S12, the master and slave station management module 103 issues a frame indicating rejection of the shift request to shift to the master station mode, and causes the control processing unit 102 to transmit the issued frame to the current master station.

If it is not the time to shift to the master station mode, the master and slave station management module 103 returns to the operation of step S4. On the other hand, if it is the time to shift to the master station mode, the master and slave station management module 103 shifts to the master station mode (step S5), and proceeds to a master station routine. As described above, the master and slave station management module 103 sets predetermined master station requirements, such as whether there is the capability of operating as the master station, and whether there is the information for operating as the master station, and if the predetermined master station requirements are satisfied, the master and slave stations management module 103 changes the operation mode, allowing the terminal device to act as the master station. The operation mode is a management detail of the master and slave station management module 103.

Figure 3B:
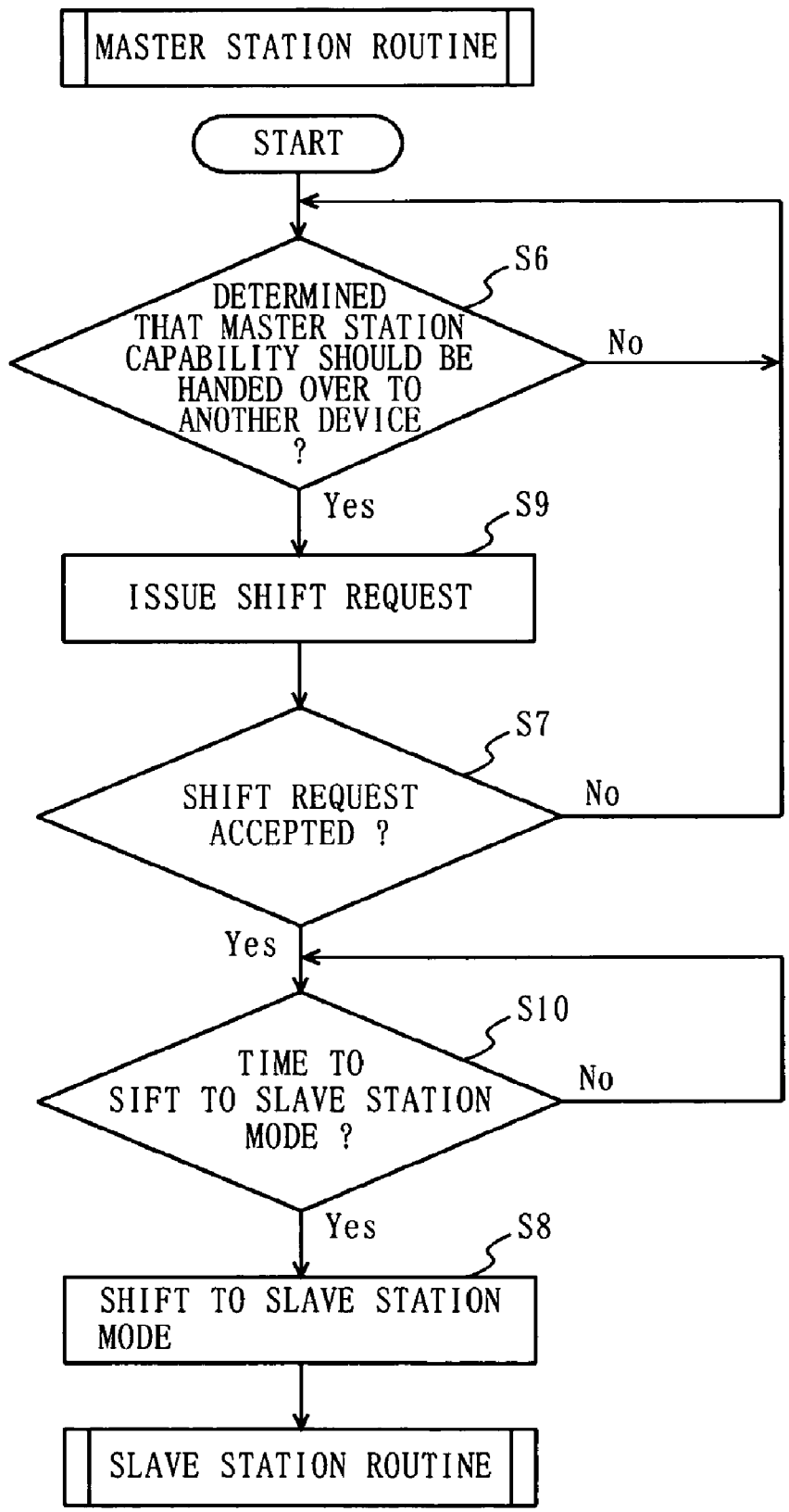
FIG. 3B is a flowchart showing a flow of a process (a master station routine) in the master and slave station management module in the case where the terminal device is acting as a master station.

FIG. 3B is a flowchart showing a flow of a process (the master station routine) in the master and slave station management module 103 in the case where the terminal device is acting as the master station. The flow of the process (the master station routine) in the master and slave stations management module 103 in the case where the terminal device is acting as the master station is described below with reference to FIG. 3B.

Firstly, the master and slave station management module 103 determines whether to hand over a master station capability to another terminal device, based on information passed from the control processing unit 102 (step S6).

If there is no terminal device to which the master station capability should be handed over, the master and slave station management module 103 returns to the operation of step S6. On the other hand, if there is any terminal device to which the master station capability should be handed over, the master and slave station management module 103 generates a frame for providing the terminal device with a request to shift to the master station mode, and causes the control processing unit 102 to instruct the PLC transmission/reception unit 101 to issue the frame (step S9). Then, the master and slave station management module 103 activates a prompt timer. If a response frame is received from the terminal device before the prompt timer expires, the master and slave station management module 103 determines whether the response frame indicates acceptance of the request to shift to the master station mode (step S7). If the response frame indicates rejection of the request to shift to the master station mode or if the response frame is not received from the terminal device before the prompt timer expires, the master and slave station management module 103 returns to the operation of step S6. On the other hand, if the response frame indicates acceptance of the request to shift to the master station mode, the master and slave station management module 103 determines whether it is the time to shift indicated by the response frame (step S10).

If it is not the time to shift to the master station mode, the master and slave station management module 103 repeatedly performs the operation of step S10. On the other hand, if it is the time to shift to the master station mode, the master and slave station management module 103 shifts to the slave station mode (step S8), and proceeds to the slave station routine. As described above, the master and slave station management module 103 transmits the request to shift to the master station mode, and thereafter changes the operation mode, allowing the terminal device to act as the slave station.

Note that although the time to shift is described above as information set by the slave station having accepted to shift in response to the shift request to shift to the master station mode, the time to shift may be information set by the master station which issues the shift request to shift to the master station mode or may be information obtained after the master and slave stations confirm the time to shift. For example, if a beacon sequential number assigned by numbering beacons is assumed to be described in a beacon frame issued by the master station, the time to shift to the master station mode may be designated by the beacon sequential number. Alternatively, the master station having received a response frame may activate a decrement counter based on information described in the response frame, and transmit a beacon frame which describes a counter value. In this case, the slave station may determine that the time to shift to the master station mode is when the counter value is "0".

FIG. 4 is a sequence diagram showing a flow of a master station capability handover process. The flow of the handover process for handing over the master station capability will be described below with reference to FIG. 4.

Firstly, in a statistical information storage period (T101), the control processing unit 102 in each of the terminal devices A through D stores in the storage device 106 the statistical information, such as information related to an average value of intensities of signals received from other terminal devices, and information indicating whether ACK is returned from a destination terminal device (steps S101-S104).

FIG. 5 is a table showing an example of the statistical information in the terminal device B. As shown in FIG. 5, in the statistical information, reception intensity averages are associated with a corresponding identifier of a source terminal device, and whether ACK has been returned is shown for each identifier of destination terminal devices. The reception intensity averages are indicated by relative values. A terminal device indicated by ○ has returned ACK, and therefore transmission thereto is possible. A terminal device indicated by X has not returned ACK, and therefore transmission thereto is not possible. As shown in FIG. 5, for example, the terminal device B has received signals from the terminal device A at an average intensity of 10. The terminal device B is able to transmit/receive a signal to/from the terminal device A but unable to transmit/receive a signal to/from the terminal device C.

Next, in a statistical information collection period (T102), the terminal devices B through D, which are slave stations, transmit collected statistical information to the terminal A which is the master station (steps S105 through S107). In accordance with this, the control processing unit 1803 of the terminal device A collects the transmitted statistical information into collected statistical information (step S108).

FIG. 6 is a table showing an example of the collected statistical information. As shown in FIG. 6, in the collected statistical information, the statistical information as shown in FIG. 5 is indicated for each terminal device from which the statistical information has been collected.

Next, the terminal device A determines, based on the collected statistical information, whether there is any terminal device capable of high-quality communication with each terminal device in the communication system as compared to the terminal device A itself, or whether there is any terminal device capable of most improving system performance if it operates as the master station (step S109). Specifically, the terminal device A initially removes any terminal device which is unable to transmit a signal to another terminal device from a list of candidates for the master station. In the example shown in FIG. 6, it is apparent that communication between the terminal devices B and C is not possible, and therefore the terminal device A removes the terminal devices B and C from the list of candidates for the master station. Next, the terminal device A determines whether there is any terminal device which is capable of receiving a signal from another terminal device with quality higher than the quality with which the terminal device A is able to communicate with any terminal device. If there is such a terminal device, the terminal device A determines the terminal device as a master station capability handover destination In the example shown in FIG. 6, reception intensity averages of signals from other terminal devices to the terminal device D are higher than reception intensity averages of signals from those terminal devices to the terminal device A, and therefore the terminal device A determines the terminal device D as the master station capability handover destination.

Next, the terminal device A transmits a handover packet, which indicates a handover of the master station capability, to the terminal device which is a destination of the handover (step S110). The terminal device having received the handover packet returns a response, which indicates the receipt of the handover packet, to the terminal device A (step S111), and thereafter starts to act as the master station if the terminal device satisfies the predetermined master station requirement. The predetermined master station requirement is as specified in steps S2 and S3 of FIG. 3A.

The master station has a capability of controlling media access of terminal devices in the communication system. In order for each terminal device in the communication system to optimally use the communication medium, it is required to ensure interactive communication between each terminal device and the master station. In the first embodiment, each terminal device notifies the master station of a result of monitoring the communication status to the current master station as the statistical information. The current master station determines, based on the statistical information, whether there is any terminal device suitable as a master station as compared to the current master station itself. If there is a terminal device positioned in such a physical location as to optimize communication within the communication system, the current master station hands over the master station capability to the terminal device positioned in the optimal location such that the terminal device becomes the next master station. In this manner, an optimum master station is automatically selected so as to enable each terminal device in the communication system to optimally use the communication medium.

Note that each terminal device may return ACK, which describes a reception intensity, upon receipt of a unicast packet from another terminal device. This allows the terminal device on the transmission side to store, as the statistical information, the intensity of a transmission packet at the time of delivery. The intensity of the transmission packet at the time of delivery can be used as information for selecting the next master station.

Further, each terminal device may use, as the statistical information, the number of packets transmitted/received to/from other terminal devices. In this case, the master station determines, as the master station capability handover destination, a terminal device having transmitted/received the maximum number of packets to/from other terminal devices. In this manner, the number of packets transmitted/received is used as information for determining the next master station, and therefore it is possible to determine the next master station in accordance with the frequency of occurrences of communication between terminal devices.

Furthermore, each terminal device may store, as the statistical information, the number of retransmissions to other terminal devices. In this case, the current master station may determine, as the master station capability handover destination, a terminal device with a small number of retransmissions. In this manner, the number of retransmissions is used as information for determining the next master station, and therefore it is possible to determine the next master station in accordance with the quality of communication between terminal devices.

Further still, in the case where the present communication system is applied to a power line communication system, noise in synchronization with a commercial power supply cycle can be seen on a power line medium. Accordingly, each terminal device may store, as the statistical information, information related to the noise in synchronization with the commercial power supply cycle, and notify the stored information to the current master station. In this case, the current master station may consider a slave station, which is less susceptible to the noise, as a candidate for the master station capability handover destination, based on the information related to the noise in synchronization with the commercial power supply cycle.

(Second Embodiment)

Figure 7:
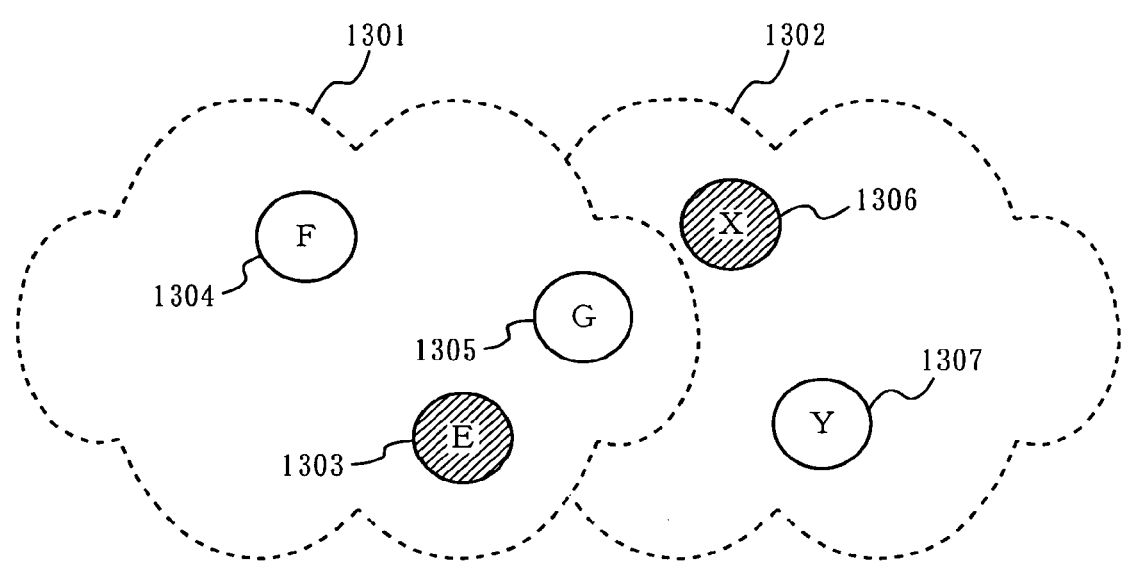
FIG. 7 is a diagram schematically showing structures of communication systems according to a second embodiment of the present invention.

FIG. 7 is a diagram schematically showing structures of communication systems 1301 and 1302 according to a second embodiment of the present invention. In FIG. 7, the communication systems 1301 and 1302 are assumed to be provided adjacent to each other. The communication system 1301 includes terminal devices 1303 through 1305. The communication system 1302 includes terminal devices 1306 and 1307. Note that the number of terminal devices is not limited to the example shown in FIG. 7.

In the communication system 1301, the terminal device 1303 (hereinafter, referred to as a "terminal device E") is a master station. The terminal devices 1304 and 1305 (hereinafter, referred to as "terminal devices F and G", respectively) are slave stations. In the communication system 1302, the terminal device 1306 (hereinafter, referred to as a "terminal device X") is a master station. The terminal device 1307 is a slave station. The terminal devices E, F, G, and X are assumed to have both a capability of operating as the master station and a capability of operating as the slave station.

In the second embodiment, a structure of each terminal device is as described in the first embodiment, and FIG. 2 is referred to for the structure. Also, the function of the master and slave station management module 103 is as described in the first embodiment, and FIGS. 3A and 3B are referred to for the function.

In each communication system, each terminal device receives packets (i.e., interference) from external to the communication system to which the terminal device belongs, and statistically stores the number of packets received from the external communication system, intensities of the packets received from the external communication system, etc.

Each terminal device periodically notifies stored statistical information to the master station in the communication system to which the terminal device belongs.

The master station having received a packet containing the statistical information compares the statistical information contained in the packet to statistical information stored by the master station itself, to determine whether there is any terminal device having received interference which is not received by the master station or whether there is any terminal device having received interference at a level greater than that of interference received by the master station. If there is such a terminal device, a process for handing over the master station capability to the terminal device is activated.

Figure 8:
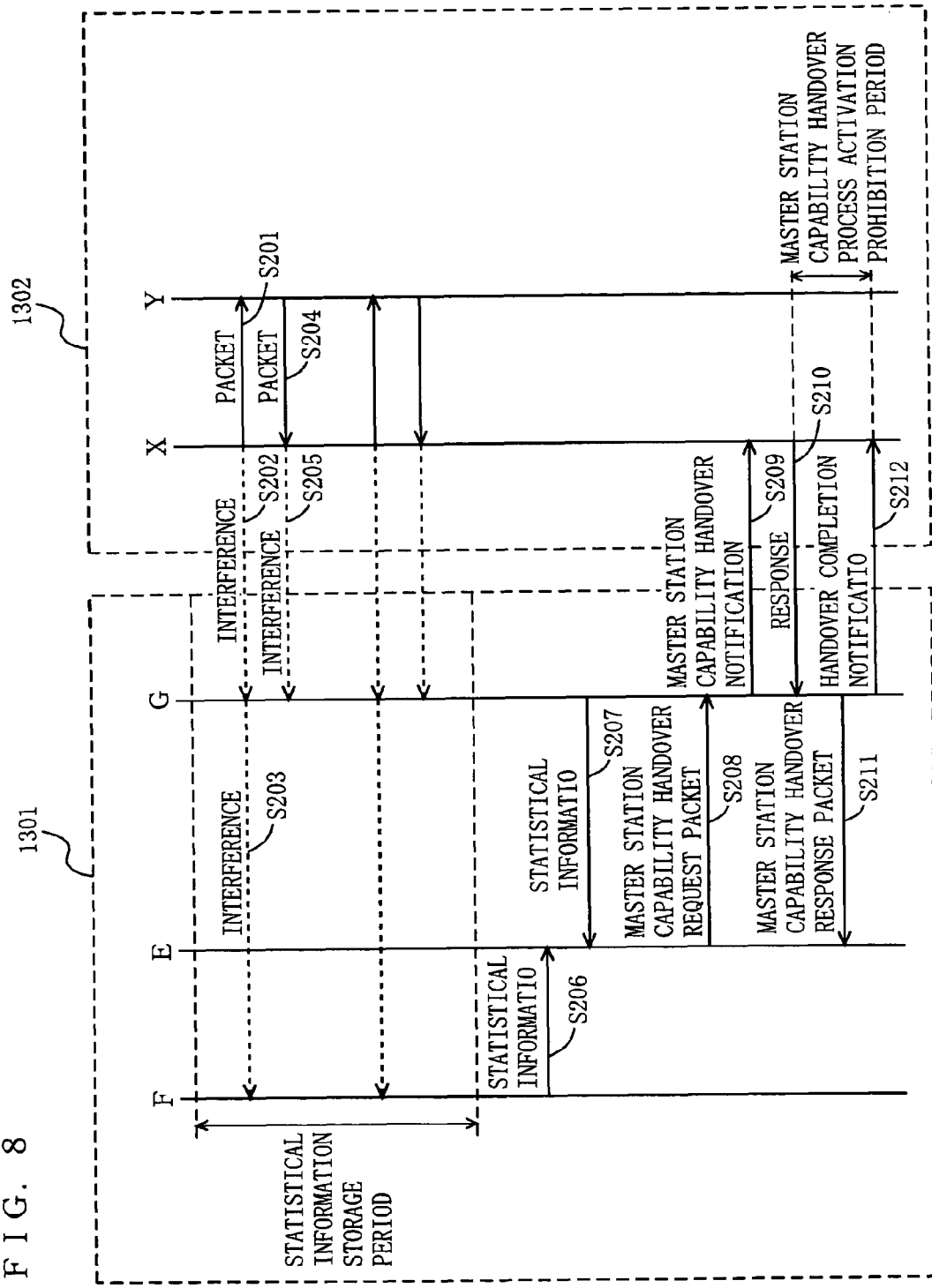
FIG. 8 is a sequence diagram showing a general outline of a master station capability handover process in the second embodiment.

FIG. 8 is a sequence diagram showing a general outline of a master station capability handover process in the second embodiment. The general outline of the handover process for handing over the master station capability in accordance with the second embodiment will be described below with reference to FIG. 8.

It is assumed that in communication within the communication system 1302, the terminal device X transmits a packet to the terminal device Y (step S201). The packet is assumed to be delivered out of the communication system 1302 to the terminal devices F and G in the communication system 1301 (steps S202 and S203). The terminal devices G and F, which have received the packet transmitted from the external communication system, recognize reception of interference, and store a reception intensity of the packet in association with the terminal X which is a transmission source of the packet.

It is assumed that in communication within the communication system 1302, the terminal device Y transmits a packet to the terminal device X (step S204). The packet is assumed to be delivered out of the communication system 1302 to the terminal device G in the communication system 1301 (step S205). The terminal device G, which has received the packet transmitted from the external communication system, recognizes reception of interference, and stores a reception intensity of the packet in association with the terminal Y which is a transmission source of the packet. FIG. 9 is a table showing an example of the statistical information stored in the terminal device G. As shown in FIG. 9, in the statistical information, an intensity average of received packets and the number of receptions are stored in association with a corresponding identifier of a source terminal device.

After a passage of a statistical information storage period, the terminal devices F and G in the communication system 1301 transmit the statistical information collected in that period to the terminal device E which is the master station (steps S206 and S207). Note that any terminal device, which does not receive interference from the external communication system during the statistical information storage terminal, may not transmit the statistical information to the master station.

The terminal device E, which is the master station, compares statistical information stored the rein to the statistical information transmitted from the terminal devices F and G, which are slave stations, to recognize a terminal device determined as receiving the maximum interference from the external communication system. FIG. 10 is a table showing an example of the statistical information collected by the master station E. As shown in FIG. 10, in the collected statistical information, a reception intensity average and the number of receptions corresponding to source terminal devices are stored in association with a corresponding identifier of a terminal device having the statistical information stored therein. In the example shown in FIG. 10, the terminal device G can be determined as receiving the maximum interference from the communication system 1302. Accordingly, in order to hand over the master station capability to the terminal device G, the terminal device E transmits a master station capability handover request packet (i.e., an IND_CTRL frame shown later in FIG. 21) to the terminal device G (step S208).

The terminal device G having received the master station capability handover request packet determines whether it is allowed to operate as the master station. If it is determined to be allowed to operate as the master station, the terminal device G provides a notification that a master station capability has been handed over (i.e., transmits IND_MOV frame which will be described later in conjunction with FIG. 21) to a terminal device in the communication system 1302 (or to the terminal device X which is prioritized in the case where the terminal device X is recognized as operating as the master station in the communication system 1302) (step S209). Note that the terminal device G uses, as a criterion of determination, whether the terminal device G can satisfactorily communicate with another terminal device in the communication system 1301, thereby determining whether it is allowed to operate as the master station.

The terminal device X having received the master station capability handover notification prohibits a process for handing over the master station capability from being implemented in the communication system 1302, and transmits a response (an RSP_MOV frame which will be described later in conjunction with FIG. 21) to the terminal device G (step S210).

If there is a response from the terminal device X, the terminal device G transmits to the terminal device E a master station capability handover request response packet (an RSP_CTRL frame which will be described later in conjunction with FIG. 21) which describes information related to the time to hand over the master station capability (step S211). Thereafter, at the time described in the master station capability handover request response packet, the terminal device E starts to act as the slave station, and the terminal device G starts to act as the master station.

Note that if any response is not returned from the terminal device X after a lapse of a predetermined time period since the master station capability handover notification was transmitted, the terminal device G transmits a master station capability handover response packet to the terminal device E.

If the master station capability has normally been handed over, the terminal device G, which is a new master station, provides the terminal device X with a notification (a CMP_MOV frame which will be described later in conjunction with FIG. 21) which indicates that the handover of the master station capability has been completed (step S212). In accordance with this, the terminal device X withdraws prohibition of implementation of the process for handing over the master station capability in the communication system 1302.

Hereinbelow, an operation of a communication system according to the second embodiment will be described in detail. In the second embodiment, each slave station (a controlled station) carries out media access based on a control frame (a beacon frame) repeatedly transmitted by the master station (a control station).

In the second embodiment, each communication system is assigned with an indicator (hereinafter, referred to as a "network ID") for identifying the communication system.

FIG. 11 is a diagram showing a structure of a frame (also referred to as a "packet") transmitted by a terminal device in the communication system according to the second embodiment. As shown in FIG. 11, each frame transmitted by terminal devices contains a field 2001 storing a network ID, a field 2002 storing an indicator identifying a destination terminal device, and a field 2003 storing an indicator identifying a source terminal device. Note that these fields may be data fields to which a redundant modulation scheme is applied, such that the data fields are resistant to noise and disturbance.

Figure 12:
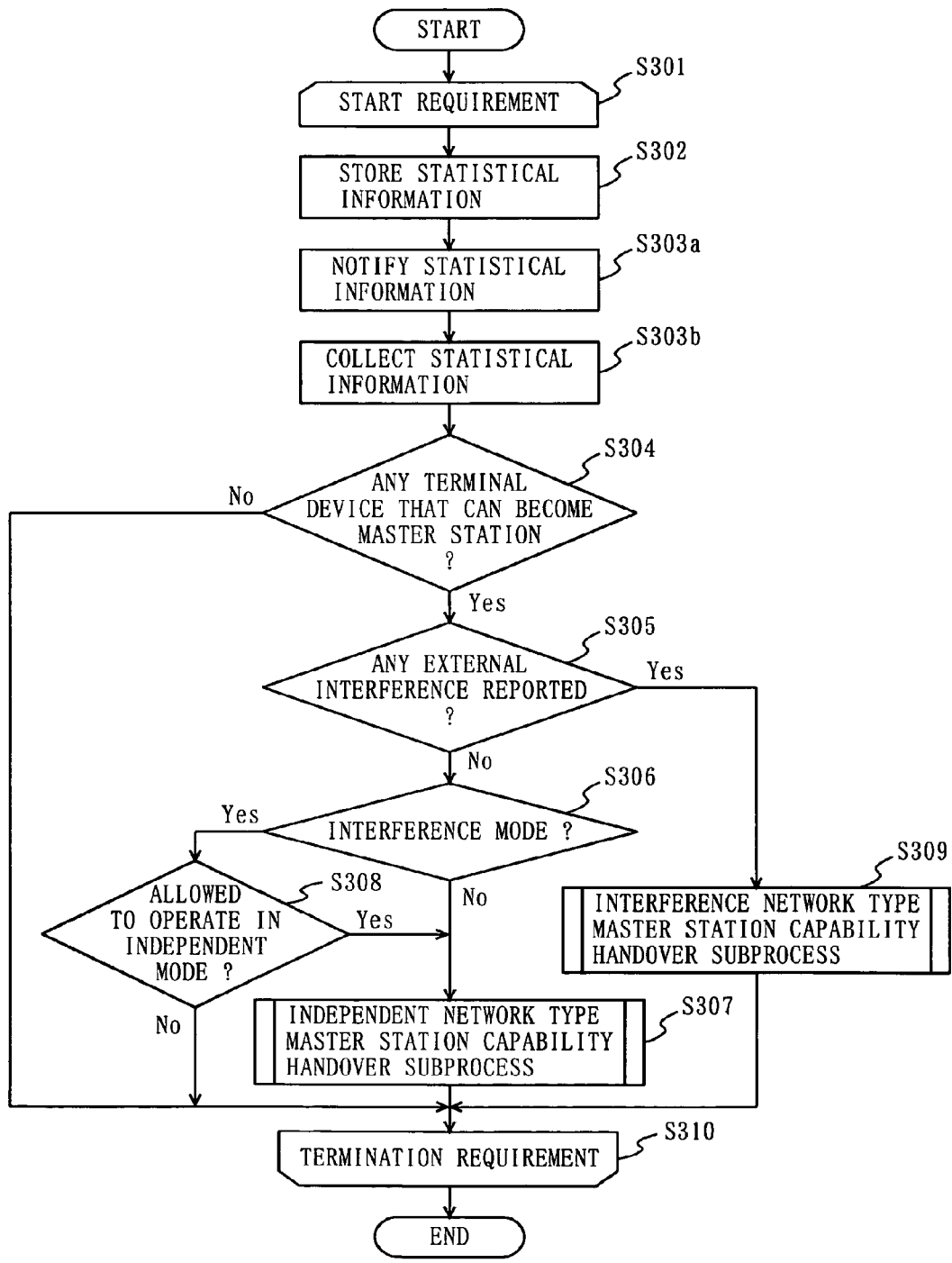
FIG. 12 is a flowchart showing the details of an operation of the communication system according to the second embodiment.

FIG. 12 is a flowchart showing the details of the operation of the communication system according to the second embodiment. Hereinbelow, the details of the operation of the communication system according to the second embodiment will be described with reference to FIG. 12. Note that in the flowchart of FIG. 12, the subject of the operation in each step is the master station, the slave station or both of them. What is the subject of the operation is specified in a timely manner. Although an operation in each station is performed by the control processing unit 102 shown in FIG. 2, in the following descriptions, for the sake of simplification, it is merely stated that the station implements the operation. The control processing unit 102 may be realized by a plurality of functional sections capable of executing operations as described below, or by causing a general-purpose CPU to implement a program for executing the operations as described below. The control processing unit 102 is not limited to any structure so long as it is able to execute the operations as described below.

The procedure shown in FIG. 12 is started when the master station determines that a predetermined start requirement is satisfied (step S301), and it is repeated until the master station determines that a predetermined termination requirement is satisfied (step S310).

If the predetermined start requirement is satisfied, each terminal (the master and slave stations) on the communication system stores the statistical information in the storage unit 106 (step S302).

FIG. 13 is a table showing an example of a data structure of the statistical information. For example, as shown in FIG. 13, the statistical information is 16-octet information consisting of items such as control information (CTR) 3001, a network ID (ADR) 3002, a reception terminal device number (NRS) 3003, an average signal amplification factor (SAR) 3004, and a directed frame number (NLP) 3005 which indicates the number of frames directed to the terminal device itself.

Figure 14:
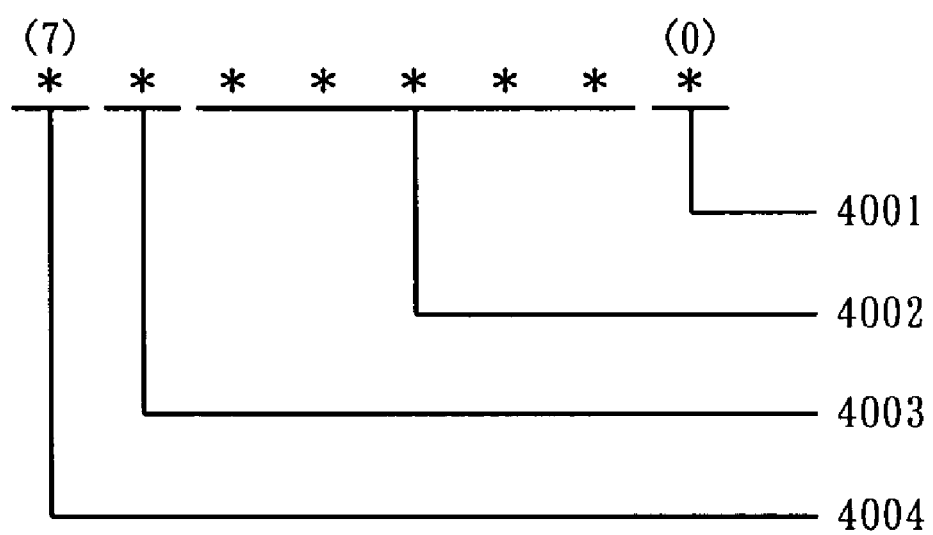
FIG. 14 is a diagram showing an example of the contents of control information in the statistical information.

The control information 3001 is 1-octet information stored in a CTR field. FIG. 14 is a diagram showing an example of the contents of the control information in the statistical information. As shown in FIG. 14, the control information consists of a flag 4001 indicating whether an ability to become the master station is available, an unused region 4002, a flag 4003 indicating whether a beacon frame transmitted by an external communication system has been received one or more times, and a flag 4004 indicating whether a packet transmitted by a station belonging to an external communication system has been received one or more times. In the present embodiment, the flag 4001 is on if the terminal device is able to become the master station. The flag 4003 is on if a beacon frame transmitted from the master station in an external communication system has been received once or more times. The flag 4004 is on if a packet transmitted from a station belonging to the external communication system has been received once or more times. Note that the flag 4003 may indicate whether a transmission from the master station in the external communication system has been received. In the case of determining whether a received packet has been transmitted in the external communication system, each terminal device refers to the field 2001 shown in FIG. 11, and compares it with the network ID of the terminal device. If they do not match with each other, the terminal device determines that the received packet has been transmitted in the external communication system. Whether a terminal device is able to become the master station may be determined based on hardware resources owned by the terminal device, or may be determined by a user, a connection status, or a communication status.

The network ID 3002 is 6-octet information stored in an ADR field, and indicates a network ID of an external communication system if there is interference by the external communication system. Note that the network ID may be any indicator so long as it identifies a network. The network ID 3002 may be updated upon each receipt of a packet from the external communication system. Alternatively, the network ID 3002 may be described in a recent packet received from an external network. If the flag 4004 shown in FIG. 14 is not on, it is indicated that any packet from the external network has never been received, and therefore any description in the field is invalid.

The reception terminal number 3003 is 1-octet information stored in an NSR field, and indicates the number NRS of source terminal devices of received frames. That is, the reception terminal device number indicates the number of stations having issued frames that have been received, rather than the number of the received frames. Note that in order to count these values, each terminal device is required to prepare an identification indicator of a station having issued a received frame to recognize the issuance source of the received frame. To this end, each terminal device may prepare a hash table for each address of source terminal devices, and refers to the hash table based on the received frame, thereby rapidly distinguishing the source terminal device.

The average signal amplification factor 3004 is 4-octet information stored in a SAR field, and indicates an average of amplification factors for amplifying signals attenuated through the communication medium. As this value becomes greater, attenuation of signals transmitted through a transmission path becomes greater. Accordingly, a terminal device whose average amplification factor is small is basically present in a location with a satisfactory state of communication. Note that the average signal amplification may take account not only of the terminal device but also of all detectable frames. Each terminal device may detect a field (a preamble) in a frame, which is used for determining timing for a data description region in the frame, thereby determining a signal amplification factor of the frame. Consider a case where a signal amplification factor when a terminal device detects an n'th frame is SAV(n), a signal amplification factor when the terminal device detects an n−1'th frame is SAV(n−1), the number of frames when the terminal device detects the n−1'th frame is NAP(n−1), and an average signal amplification factor a signal amplification factor when the terminal device detects first through n'th frames is SAR(n). In this case, the terminal device may calculate SAR by using a formula for computation, SAR(n)={SAR(n−1)×NAP(n−1)+SAV(n)}/(NAP(n−1)+1). Alternatively, each terminal device may take account only of frames directed thereto, and may substitute NLP for NAP in the above formula for computation to obtain the average signal amplification factor.

The directed frame number 3005 is 4-octet information stored in an NLP field, and indicates the number NLP of frames directed to the terminal device itself. Note that NAP may be used instead of using NLP, or both NLP and NAP may be used.

Note that FIG. 13 shows merely an example of the statistical information, and the statistical information is not limited to this so long as it contains interference information related to interference of signals received from the external communication system. In FIG. 13, the reception terminal device number NRS corresponds to the interference information. Alternatively, the interference information may be, for example, information related to received signal intensities of the signals received from the external communication system, information related to the number of the signals received from the external communication system, or information related to intensities of the signals received from the external communication system. Although the present embodiment has been described with respect to a case of storing the interference information, any information which allows a communication status in the external communication system to be recognized (hereinafter, such information is referred to as "communication status information") may be stored instead of storing the interference information.

Note that in the case where a terminal device in the external communication system detects a frame from a terminal device in the communication system, if the terminal device in the external communication system notifies information related to a received signal intensity of the frame to the terminal device in the communication system which is a source of the frame, the communication status information may be the information related to the received signal intensity notified by the external communication system. This allows the terminal device to notify the master station the communication status information, as the statistical information, which indicates at what level the transmission from the terminal device is received by the terminal device in the external communication system.

The statistical information also contains own-system information related to a communication status of the communication system to which the terminal device itself belongs. In the example of FIG. 13, the average signal amplification factor SAR and the directed frame number NLP correspond to the own-system information. Alternatively, the own-system information may be information related to the number of retransmissions of a frame transmitted by the slave station, or information related to the type of a frame received by the slave station.

Alternatively, the statistical information may further contain, for example, an indicator for identifying a source terminal device, a frame reception intensity for each source terminal device, an error correction rate, and a communication medium occupation rate of frames directed to the terminal device itself.

Moreover, the statistical information may not contain any information as described above. Note that the size of each item is not limited as shown in FIG. 13. The location of each bit field is not limited as shown in FIG. 14.

Referring back to FIG. 12, after step S302, each slave station notifies the stored statistical information to the master station (step S303a). The master station collects the statistical information notified by each slave station (step S303b).

Figure 15:
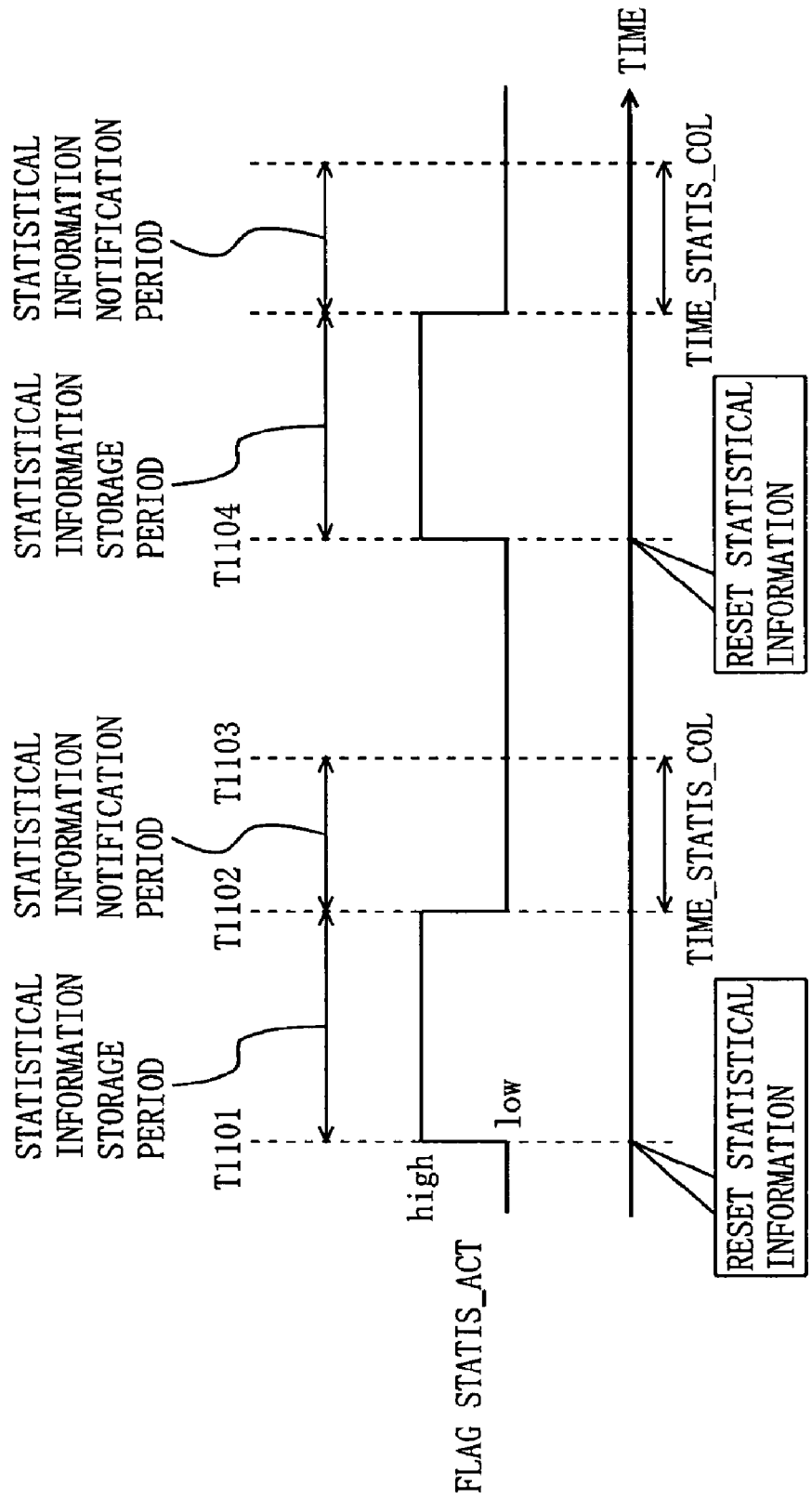
FIG. 15 is a timing chart showing a period for storing the statistical information and a period for notifying the statistical information.

FIG. 15 is a timing chart showing a period for storing the statistical information and a period for notifying the statistical information. Referring to FIG. 15, time to store the statistical information and time to notify the statistical information are described below.

The master station causes a flag STATIS_ACT in a beacon frame, which indicates the time to store and notify the statistical information, to be come high or low, thereby controlling the storage and notification of the statistical information. If the flag STATIS_ACT shifts from low to high (T1101), each terminal device resets the statistical information, and starts storing the statistical information. If the flag STATIS_ACT shifts from high to low (T1102), each terminal device ceases to store the statistical information. Then, the slave stations notify the master station of the stored statistical information. In parallel with this, the master station activates a timer for which the time TIME_STATIS_COL is set as a stop time. Until the stop time of the timer elapses, the master station receives the statistical information from the slave stations. Upon the lapse of the stop time of the timer, the master station ceases receiving the statistical information from the slave stations. The slave stations do not have to recognize when the stop time T1103 arrives. The master station ignores the statistical information delivered after the stop time T1103. Thereafter, if the STATIS_ACT becomes high, as described above, each terminal device resets the statistical information to start storing the statistical information, and repeats the operation as described above. Note that the flag STATIS_ACT is a flag controlled in accordance with the state of the master station, and may not change periodically. Note that the storage period of the statistical information may be designated by the master station designating the time. As for the notification period of the statistical information, the slave stations may individually notify the statistical information upon arrival of the time designated by the master station. The terminal device, which collects the statistical information notified by the slave stations, may be a specific terminal other than the master station. In this case, the statistical information collected by the specific terminal device may notify the master station of the statistical information. Moreover, the specific terminal device may declare that the storage period of the statistical information and the notification period of the statistical information are started.

Referring back to FIG. 12, after step S303, the master station determines whether there is any terminal device, which can become a new master station, among the slave stations having notified the statistical information (step S304). Specifically, the master station refers to the flag 4001 (see FIG. 14) contained in the control information 3001 shown in FIG. 13, and determines whether there is any terminal device which can become the new master station. Note that the flag 4001 may be used for determining whether there is the intention of becoming the new master station. If there is no terminal device which can become the new master station, the master station proceeds to an operation of step S310. On the other hand, if there is any terminal device which can become the new master station, the master station proceeds to an operation of step S305.

In step S305, the master station refers to the collected statistical information, and determines whether there is any terminal device subjected to interference from the external communication system. Specifically, the master station refers to the flag 4004 contained in the control information 3001, and determines whether there is any terminal device subjected to interference from the external communication system. Note that the interference from the external communication system may be limited to interference from a master station in the external communication system. If there is any interference from the external communication system, the master and slave stations proceed to a subprocess for handing over a capability of a master station of an interference network type (step S309). The interference network type master station capability handover subprocess will be described later. On the other hand, if there is no terminal device subjected to interference from the external communication system, the master station proceeds to an operation of step S306.

In step S306, the master station determines whether the current network mode is an interference mode. The network mode indicates whether the master station on the network is determined with consideration of interference from the external communication system, and can be either the interference mode or an independent mode. In the interference mode, the master station is determined with consideration of the interference from the external communication mode. In the independent mode, the master station is determined without consideration of the interference from the external communication mode. If the current network mode is not the interference mode, the master and slave stations proceed to a subprocess for handing over a capability of a master station of an independent network type (step S307). The independent network type master station capability handover subprocess will be described later. On the other hand, if it is the interference mode, the master station proceeds to an operation of step S308.

In step S307, the master and slave stations cooperatively implement the independent network type master station capability handover subprocess. In the independent network type master station capability handover subprocess, the master station determines, based on the collected statistical information, whether there is any slave station, which is suitable for the new master station, among the slave stations having noticed the statistical information. If there is such a slave station, the master station hands over the master station capability to the slave station.

Figure 16:
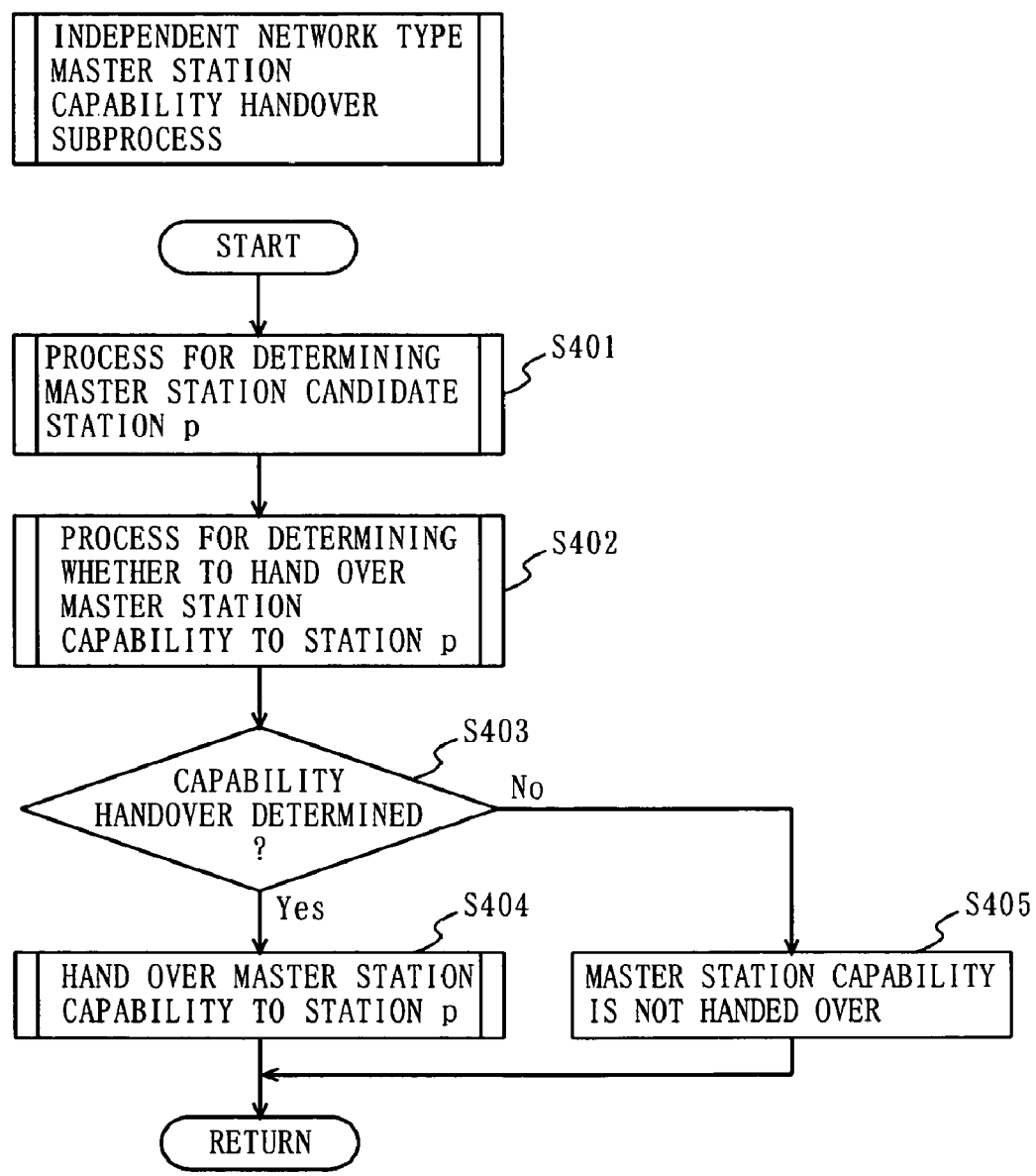
FIG. 16 is an exemplary flowchart showing the details of an independent network type master station capability handover subprocess.

FIG. 16 is an exemplary flowchart showing the details of the independent network type master station capability handover subprocess in step S307. Hereinbelow, the independent network type master station capability handover subprocess will be described in detail with respect to a case where the current master station is a station m and a slave station, which becomes the new master station, is a station p. Note that the process shown in FIG. 16 is merely an example. The process is not limited as shown in FIG. 16 so long as a slave station, which is suitable for a new master station, is selected based on collected statistical information. In the process shown in FIG. 16, the statistical information is assumed to contain the reception terminal device number NRS as the interference information, and also assumed to contain the average signal amplification factor SAR and the directed frame number NLP as the own-system information.

Firstly, the master station m implements a process for determining the station p which is a candidate for a new master station (step S401). Next, the master station m implements a process for determining whether to hand over the master station capability to the station p (step S402). Then, the master station m determines whether it has been determined in step S402 that the master station capability is handed over to the station p (step S403). If the handover has been determined, the master station m and the slave station p cooperatively perform the handover of the master station capability to the station p (step S404). On the other hand, if it is has been determined that the handover is not performed, the master station m does not handover the master station capability (step S405).

Figure 17:
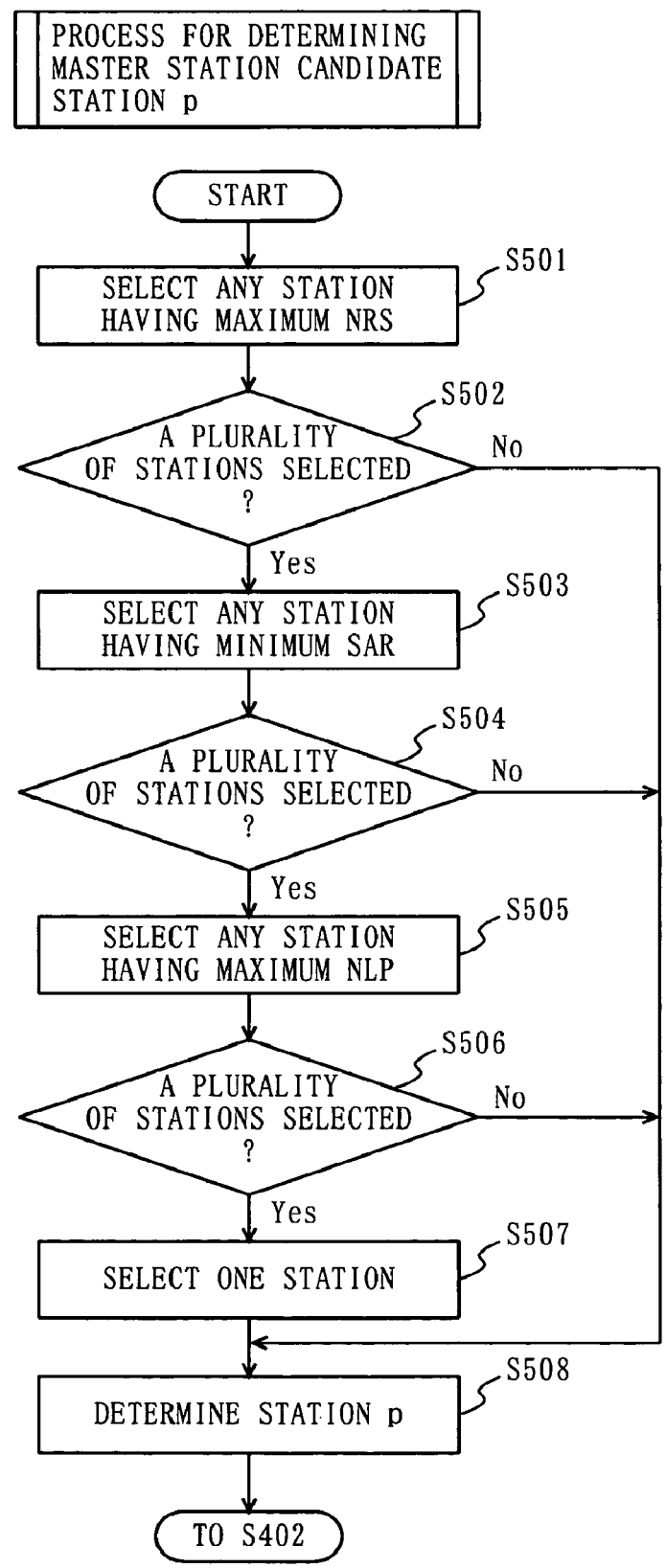
FIG. 17 is a flowchart showing the details of a process for selecting a master station candidate p (step S401 in FIG. 16)

FIG. 17 is a flowchart showing the details of the process for determining the master station candidate p (step S401) in FIG. 16. Hereinbelow, the details of the process for determining the master station candidate p (step S401) in FIG. 16 will be described with reference to FIG. 17.

Firstly, the master station m sets a first predetermined handover requirement that the reception terminal device number NRS is maximum, and refers to collected statistical information to select any station which satisfies the first predetermined handover requirement (step S501). Next, the master station m determines whether a plurality of slave stations are selected in step S501 (step S502). If the plurality of slave stations are not selected, the master station m proceeds to an operation of step S508. On the other hand, if the plurality of slave stations are selected, the master station m proceeds to an operation of step S503.

In step S503, the master station m sets a second predetermined handover requirement that the average signal amplification factor SAR is minimum, and refers to the collected statistical information to select any station which satisfies the second predetermined handover requirement. Next, the master station m determines whether a plurality of slave stations are selected in step S503 (step S504). If the plurality of slave stations are not selected, the master station m proceeds to the operation of step S508. On the other hand, if the plurality of slave stations are selected, the master station m proceeds to an operation of step S505.

In step S505, the master station m sets a third predetermined handover requirement that the directed frame number NLP is maximum, and refers to the collected statistical information to select any station which satisfies the third predetermined handover requirement. Next, the master station m determines whether a plurality of slave stations are selected in step S505 (step S506). If the plurality of slave stations are not selected, the master station m proceeds to the operation of step S508. On the other hand, if the plurality of slave stations are selected, the master station m selects one of the selected slave stations (step S507), and proceeds to the operation of step S508.

In step S508, the master station m determines the selected one slave station as the station p, which is a candidate for the new master station, and proceeds to an operation of step S402.

Note that the master station may determine a candidate station based only on the reception terminal device number NRS which is the interference information.

Figure 18:
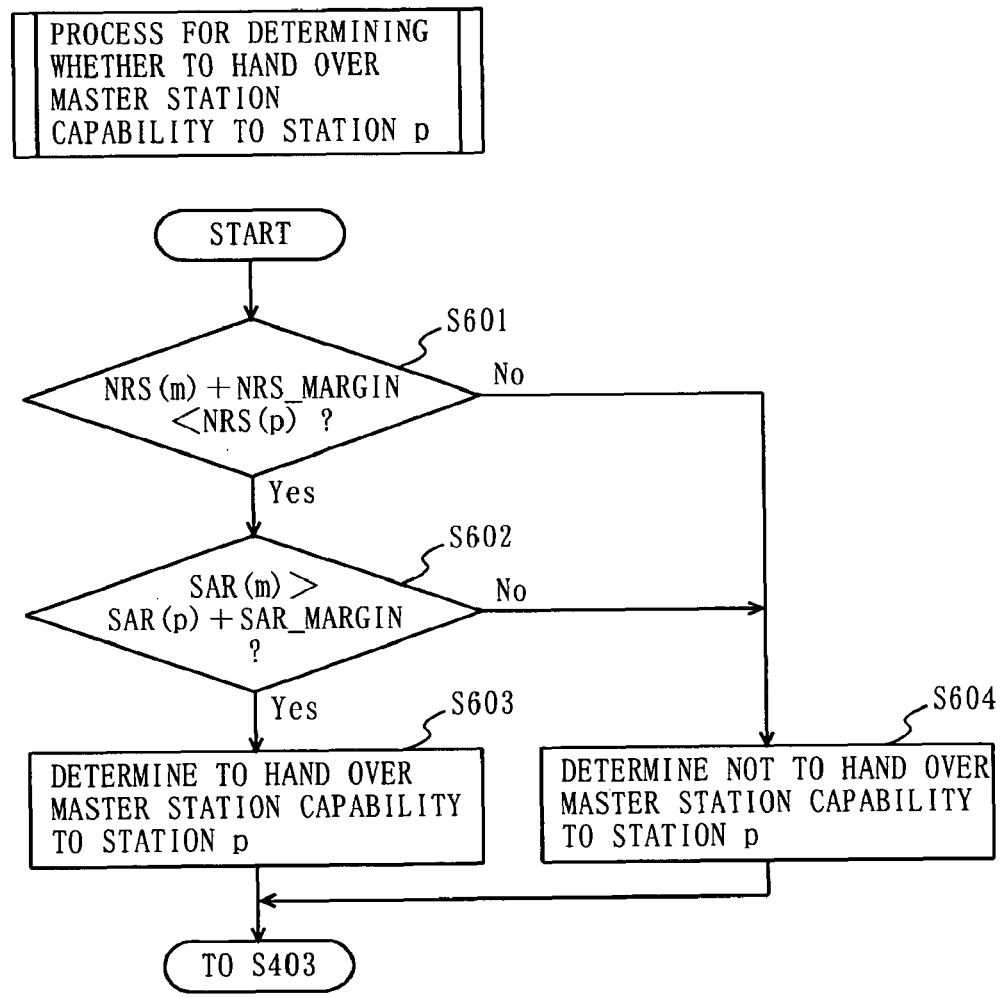
FIG. 18 is a flowchart showing the details of a process for determining whether to hand over the master station capability to the station p (step S402 of FIG. 16)

FIG. 18 is a flowchart showing the details of the process for determining whether to hand over the master station capability to the station p (step S402 of FIG. 16). Hereinbelow, the details of the process for determining whether to hand over the master station capability to the station p will be described with reference to FIG. 18. In FIG. 18, the master station m determines whether to hand over the master station capability to the station p based only on the reception terminal device number NRS and the average signal amplification factor SAR.

Firstly, the master station m determines whether a value, which is obtained by adding a margin NRS_MARGIN to reception terminal device number NRS (denoted by NRS(m) in the figure) contained in the statistical information stored in the master station m, is smaller than reception terminal device number NRS (denoted by NRS (p) in the figure) contained in the statistical information stored in the station p (step S601). Note that the margin NRS_MARGIN is a positive value which is suitably set so as to reduce the possibility of the handover of the master station capability as much as possible.

If it is determined in step S601 that the value is not smaller than the reception terminal device number NRS(p), the master station m determines not to hand over the master station capability (step S604), and proceeds to an operation of step S403. On the other hand, if the value is determined to be smaller than the reception terminal device number NRS (p), the master station m determines whether an average signal amplification factor SAR (denoted by SAR(m) in the figure) contained in the statistical information stored in the master station m, is greater than a value which is obtained by adding a margin SAR_MARGIN to an average signal amplification factor SAR (denoted by SAR(p) in the figure) contained in the statistical information stored in the station p (step S602). Note that the margin SAR_MARGIN is a positive value which is suitably set so as to reduce the possibility of the handover of the master station capability as much as possible.

If it is determined in step S602 that the average signal amplification factor SAR(m) is not greater than the value, the master station m determines not to hand over the master station capability (step S604), and proceeds to the operation of step S403. On the other hand, if the average signal amplification factor SAR(m) is determined to be greater than the value, the master station m determines to hand over the master station capability to the station p, and proceeds to the operation of step S403.

Figure 19:
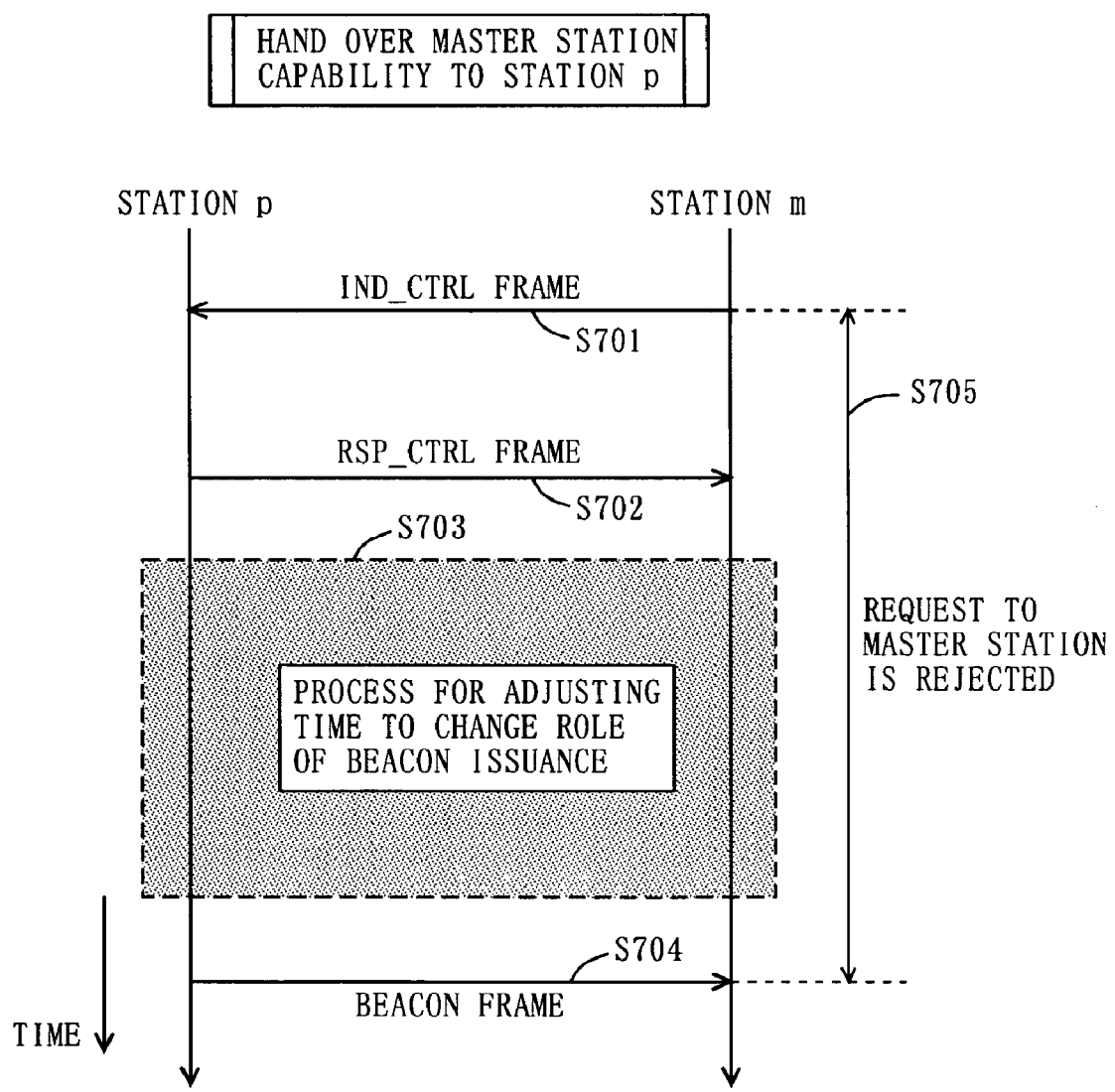
FIG. 19 is a sequence diagram showing the details of an operation of step S404 in FIG. 16.

FIG. 19 is a sequence diagram showing the details of an operation of step S404 in FIG. 16. Hereinbelow, the details of the operation of step S404 in FIG. 16 will be described with reference to FIG. 19.

Firstly, the master station m transmits to an IND_CTRL frame, contains the intention of handing over the master station capability, information required for operating as the master station, and information related to the time to hand over, thereby requesting the master station capability to be handed over (step S701). Note that the information required for operating as the master station is, for example, information related to bandwidth reservation and bandwidth allocation for each link currently controlled by the master station, information related to traffic within a network, or information related to each station in the network.

Next, upon receipt of the IND_CTRL frame, the station p causes the master and slave station management module 103 to determine whether to accept or reject a request to hand over the master station capability (see FIG. 3A), and transmits an RSP_CTRL frame, which describes a determination result, to the master station m (step S702).

Then, the master station m and the station p implement a process for adjusting timing for changing the role of a terminal device for issuing beacon frames (step S703). Specifically, the master station m describes an integer in a portion of a region of a beacon frame to be issued, and increments (or decrements) the integer for each issuance of the beacon frame. Once the integer becomes equal to or more than (or less than) a predetermined value, the station p starts to act as a master station, and the master station m starts to act as a slave station. Note that instead of incrementing (or decrementing) the integer, the master station may designate a time period until the role is changed, such that the station p starts to act as the master station after the lapse of the designated time period.

Thereafter, the station p issues a beacon frame, thereby completing the handover of the master station capability (step S704).

During a time period from the issuance of the IND_CTRL to the issuance of the beacon frame from the station p, the master station m rejects a request from other stations (step S705). For example, the master station m rejects a request related to bandwidth reservation between links, and a request related to authentication of a new participant station. The master station m may accept such a request as to draw information from the master station m.

Referring back to FIG. 12, in step S309, the master and slave stations implement the interference network type master station capability handover subprocess. In the interference network type master station capability handover subprocess, the master station determines, based on collected statistical information, whether there is any slave station, which is suitable for a new master station, among the slave stations having noticed the statistical information. If there is such a slave station, the master station hands over the master station capability to the slave station.

Figure 20:
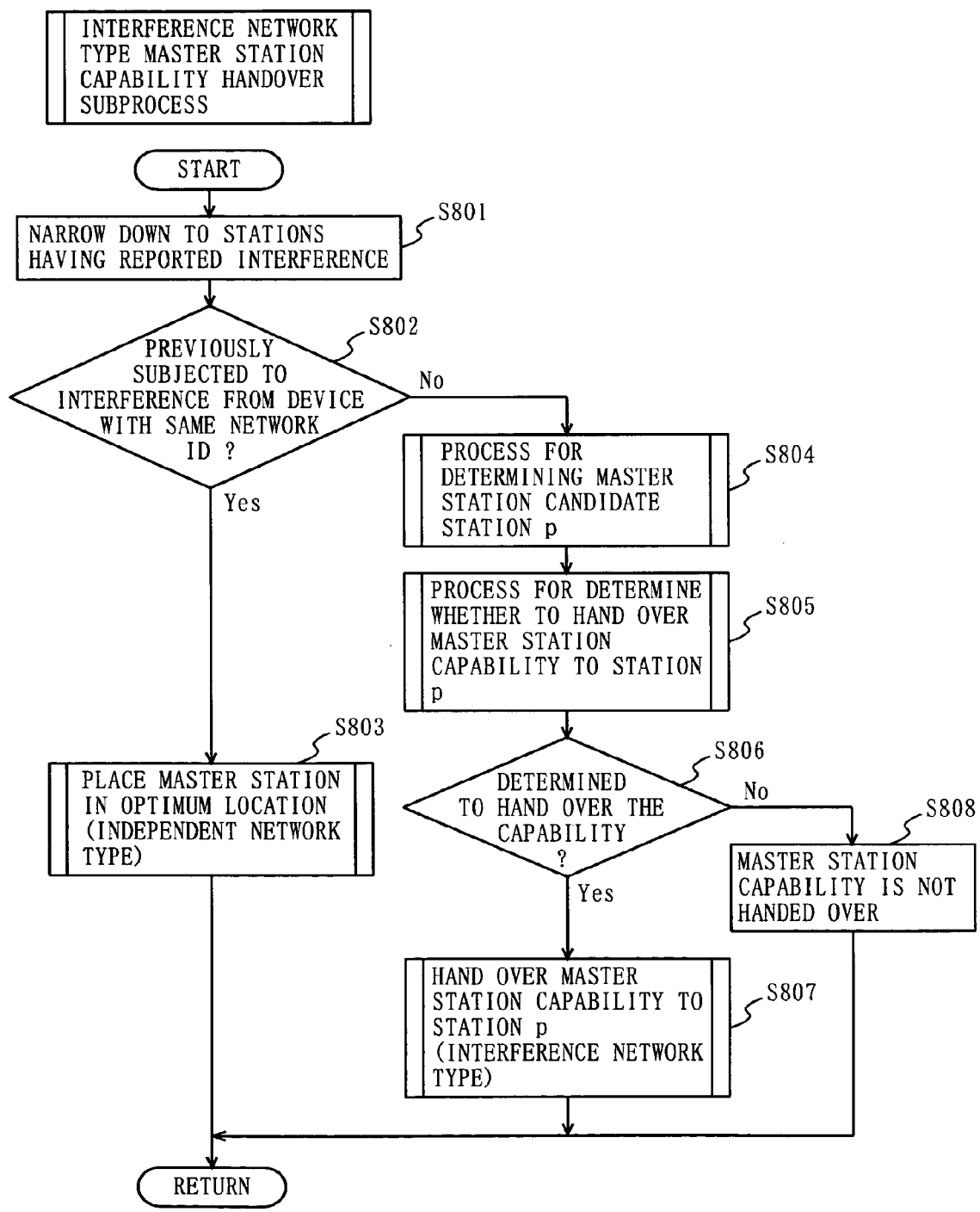
FIG. 20 is an exemplary flowchart showing the details of an interference network type master station capability handover subprocess in step S309.

FIG. 20 is an exemplary flowchart showing the details of the interference network type master station capability handover subprocess in step S309. Hereinbelow, the interference network type master station capability handover subprocess will be described in detail with reference to FIG. 20.

Firstly, the master station m narrows down candidates for a new master station to stations having reported the presence of any interference, based on collected statistical information, and ignores statistical information from stations having made no report of interference (step S801). Note that in step S801, the master station m may narrow down the candidates for the new master station to slave stations receiving a frame transmitted from a master station in an external communication system. Alternatively, the master station m may narrow down the candidates for the new master station to slave stations receiving a frame transmitted from any terminal device in an external communication system.

Next, the master station m determines for each external communication system, which is currently reported for causing external interference, whether the external interference from the external communication system has been previously reported (step S802). Specifically, the master station m determines whether slave stations are subjected to interference from any unknown external communication system other than external communication systems having been recognized as causing interference.

If all external communication systems currently reported for causing external interference have been previously reported to the master station m for causing interference, the master station m implements the independent network type master station capability handover subprocess (step S803), and determines a candidate for a new master station, thereby terminating the subprocess. The process of step S803 is basically similar to those shown in FIGS. 16 through 19, and in the process for determining the station p, which is a candidate for a new master station (step S401 of FIG. 16), the master station determines, as the candidate for a new master station, a station to which it has been previously reported that all external communication systems, which are currently reported for causing external interference, has caused interference before. On the other hand, if all the external communication systems currently reported for causing external interference have not been previously reported for causing interference, the master station m proceeds to an operation of step S804. In step S804, as in the process shown in FIG. 17, the master station m determines the station p which is the candidate of a new master station.

Next, as in the process shown in FIG. 18, the master station m determines whether to hand over the master station capability to the station p determined in step S804 (step S805).

Then, the master station m determines whether the handover of the master station capability has been determined in step S805 (step S806).

If it is determined in step S806 that the handover of the master station capability has been determined, the master station m implements a process for handing over the master station capability to the station p with consideration of external interference (step S 807). On the other hand, if the handover of the master station capability has not been determined, the master station m does not hand over the master station capability (step S 808).

Figure 21:
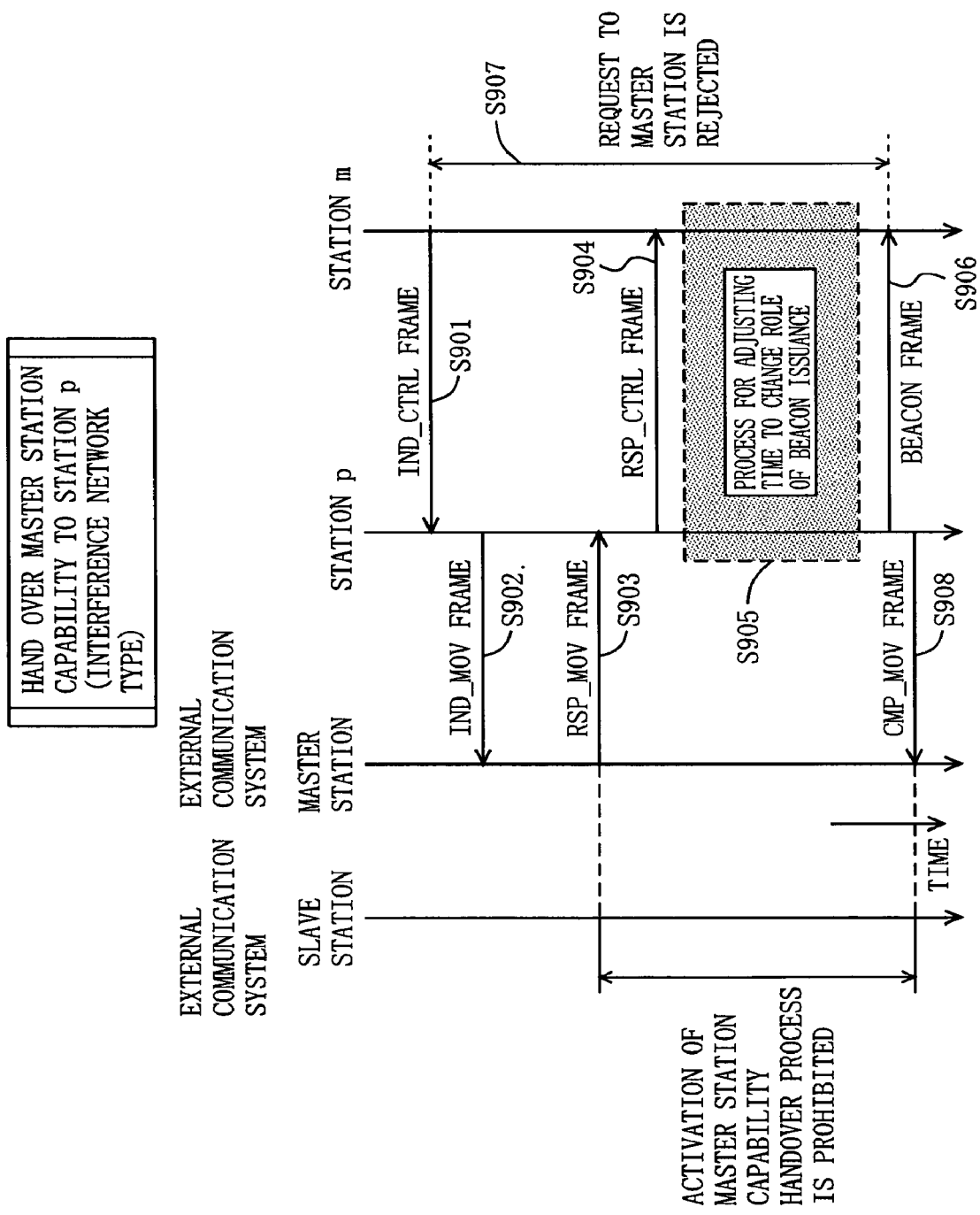
FIG. 21 is a sequence diagram showing the details of the process of step S807 in FIG. 20.

FIG. 21 is a sequence diagram showing the details of the process of step S807 in FIG. 20. Hereinbelow, the details of the process of step S807 in FIG. 20 will be described with reference to FIG. 20.

Firstly, the master station m transmits to an IND_CTRL frame, contains the intention of handing over the master station capability, information required for operating as the master station, and information related to the time to hand over (step S901). The IND_CTRL frame is transmitted for notifying that handover of the master station capability has started. Note that the information required for operating as the master station is, for example, information related to bandwidth reservation and bandwidth allocation for each link currently controlled by the master station, information related to traffic within a network, information related to each station in the network, or an indicator for indicating a process for an interference network type.

The station p having received the IND_CTRL frame transmits an IND_MOV frame to a master station in an external communication system (step S902). The master station in the external communication system having received the IND_MOV prohibits a master station capability handover process from being performed in the external communication system. Then the master station in the external communication system transmits an RSP_MOV frame, which indicates a response result, to the station p (step S903). Note that the RSP_MOV frame may describe permission information about whether the master station capability handover process is allowed to be implemented in the communication system where the master station m and the station p are present.

Next, the station p transmits an RSP_CTRL frame, which indicates whether to accept or reject a request to hand over the master station capability, to the master station m (step S904). Thereafter, similar to step S703 shown in FIG. 19, the master station m and the station p adjust timing for changing the role in issuing beacon frames (step S905). After step S905, upon arrival of time to issue a beacon frame, the station p issues the beacon frame (step S905), and starts to act as a new master station. As in the operation shown in FIG. 19, the master station m rejects acceptance of any request thereto during a time period in which handover of the master station capability is being implemented (step S907). Thereafter, the station p transmits a CMP_MOV frame, which notifies that the handover of the master station capability has been completed, to the master station in the external communication system (step S908). The master station in the external communication system having received the CMP_MOV frame withdraws prohibition of implementation of the master station capability handover process in the external communication system.

Referring back to FIG. 12, in step S308, the master station m determines whether the communication system, which is placed in the interference mode, is allowed to operate as an independent mode communication system. The operation of step S308 is implemented in the case where although the communication system is in the state where the presence of an external communication system adjacent thereto is detected and a communication medium is shared with consideration of interference from the adjacent external communication system, any terminal device in the communication system cannot detect transmission from a slave station in the external communication system during the statistical information collection period. In such a situation, there is a high possibility that the external communication system is suspended for some reason. In this case, communication efficiency may be increased by setting a new master station without taking account of interference from the external communication system. Therefore, the master station m determines whether the communication system is allowed to operate in the independent mode. Specifically, if the determination in step S308 is performed a predetermined number of times or more, the master station m determines that the communication system is allowed to operate in the independent mode. If it is determined in step S308 that the communication system is allowed to operate in the independent mode, the master station m proceeds to the operation of step S307. On the other hand, if it is determined that the communication system is not allowed to operate in the independent mode, the master station m proceeds to the operation of step S310.

As described above, in the second embodiment, if slave stations are subjected to interference from the external communication system, the master station capability is handed over to a slave station which is subjected to the highest interference. Accordingly, after the handover of the master station capability, a new master station after the handover provides each slave station with an opportunity to carryout the media access with consideration of the interference from the external communication system, and therefore it is possible to optimize communication quality even under the circumstances of the occurrence of the external interference.

Note that in the second embodiment, although each terminal has a capability of determining a candidate station for a new master station, a terminal device having only the capability of determining the candidate station for the new master station may determine a candidate station for entirely or partially implementing the master station capability.

Note that each slave station may notify the communication status information, such as the interference information, to terminal devices in the external communication system. This allows the terminal devices in the external communication system to obtain information related to external interference.

Note that information related to the IND_MOV frame and/or the CMP_MOV frame may be described in a specific region of a broadcast beacon frame. If a beacon frame transmitted by the master station m contains information related to a time period for which activation of the master station handover process is prohibited, it is possible to eliminate the station p having to transmit the RSP_MOV frame and the CMP_MOV frame.

Note that in the case where the communication system according to the second embodiment is applied to a power line communication system, noise in synchronization with a commercial power supply cycle can be seen on a power line medium. Accordingly, each terminal device may store, as the statistical information, information related to the noise in synchronization with the commercial power supply cycle, and notify the stored information to the master station. In this case, the current master station may consider a slave station, which is less susceptible to the noise, as a candidate for the master station capability handover destination, based on the information related to the noise in synchronization with the commercial power supply cycle. A determination step for this determination may be inserted somewhere between steps S501 and S507 in the flowchart shown in FIG. 17.

Note that in the second embodiment, although the process shown in FIG. 21 is implemented for implementing the interference network type master station capability handover subprocess (shown in FIG. 12), a process other than the process shown in FIG. 21 may be employed. FIG. 22 is a sequence diagram showing a flow of a process which can be implemented instead of implementing the process shown in FIG. 21. In FIG. 22, unicast between terminal devices belonging to different logical networks is not allowed. In FIG. 22, regarding implementation of the master station capability handover process, the master station m describes it in a field within a beacon frame, which indicates whether the master station capability handover process is implemented, and transmits the beacon frame to the station p (steps S1001 and S1002). There is a possibility that the beacon frame might be delivered to a terminal device belonging to an adjacent external communication system. If a master station S in the adjacent external communication system receives the beacon frame, the master station S prohibits the master station capability handover process from being implemented in its own communication system (step S1003). Note that in the case where a slave station receives the beacon frame, the slave station notifies a master station, which controls the slave station, that an external communication system is implementing the master station capability handover process. In a manner similar to the process shown in FIG. 21, the master station capability is handed over from the master station m to the station p (steps S901, S904, S905, and S907). After the master station capability is handed over to the station p, the station p transmits a beacon frame which indicates that the master station capability handover process is not in activation (steps S1004a and S1004b). In accordance with this, the master station S cancels prohibition of implementation of the master station capability handover process Note that in the case where a slave station detects the beacon frame transmitted from the station p, the slave station may notify the master station S that the external communication system is not implementing the master station capability handover process or that the external communication system has completed implementation of the master station capability handover process.

Note that the above-described embodiments can be realized by causing a CPU to execute a program, which is able to cause a CPU to execute the above-described procedure stored in a recording medium (a ROM, a RAM, or a hard disk, etc.) In this case, the program may be executed after it is stored in a storing device via a recording medium, or may be directly executed from the recording medium. Here, the recording medium includes a ROM, a RAM, a semiconductor memory such as a flash memory, a magnetic disk memory such as a flexible disk and a hard disk, an optical disk such as a CD-ROM, a DVD, and a BD, a memory card, or the like. The "recording medium" as mentioned herein is a notion including a communication medium such as a telephone line and a carrier line.

Note that each functional block as shown in FIG. 2 may be realized as an LSI, which is an integrated circuit. Each functional block may be separately constructed in a chip form, or may be constructed in a chip form so that a portion or the entire portion thereof is included. The LSI may be referred to as an IC, a system LSI, a super LSI, or an ultra LSI, etc., depending on the degree of integration. Also, the method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used. Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-described integration.

Hereinafter, an example of a network system to which each of the above-described embodiments is applied will be described. FIG. 23 is a diagram illustrating the overall structure of a system in the case where the terminal device of the present invention is applied to a high-speed power line transmission. As shown in FIG. 23, the terminal device of the present invention provides an interface between a multimedia device such as a digital TV (DTV), a personal computer (PC), and a DVD recorder, etc., and a power line. An IEEE1394 interface, a USB interface, or an Ethernet® interface may be used as an interface between the multimedia device and the terminal device of the present invention. As such, a communication network system is configured to transmit digital data such as multimedia data at high speed via a power line. As a result, unlike in a conventional cable LAN, it is possible to use a power line, which has already been installed in a home, an office, etc., as a network line without the need for installation of a network cable. Thus, the present invention can be easily installed at low cost, thereby substantially improving user-friendliness.

In the embodiment as shown in FIG. 23, the terminal device of the present invention is used as an adapter for converting a signal interface of an existing multimedia device to a power line communication interface. However, the terminal device of the present invention may be built into a multimedia device such as a personal computer, a DVD recorder, a digital television, and a home server system. As a result, it is possible to perform data transmission between the devices via a power cord of the multimedia device. It eliminates the need for wiring to connect an adapter and a power line, an IEEE1394 cable, a USB cable, and an Ethernet® cable, etc., whereby wiring can be simplified.

Also, the communication network system using a power line can be connected to the Internet, a wireless LAN, and a conventional cable LAN via a router and/or a hub. Thus, it is possible to extend a LAN system using the communication network system of the present invention without any difficulty.

Also, communication data transmitted over a power line by a power line transmission is received by a device by directly connecting to a power line. As a result, it is possible to eliminate leakage and interception of data, which become a problem of wireless LAN. Thus, the power line transmission method is advantageous from a security standpoint. It will be understood that data transmitted over a power line may be protected by an IPSec, which is an extended IP protocol, encryption of contents, other DRM schemes, and the like.

While the invention has been described in detail, the foregoing description is in all aspects illustrative and not restrictive. It is understood that numerous other modifications and variations can be devised without departing from the scope of the invention.

What is claimed is:

1. A master station belonging to one of a plurality of communication systems, and having a non-transitory memory having stored therein a program executable by a processor, wherein each of the communication systems includes a master station and at least one slave station, the master station being programmed to operate as:
   a request frame transmitting section configured to transmit, to a candidate for a new master station selected from the at least one slave station, a request frame representing a request for the candidate for the new master station to become the new master station;
   a response frame receiving section configured to receive, from the candidate for the new master station, a response frame including information indicating whether the request is accepted or not; and
   a beacon transmitting section configured to periodically broadcast a beacon frame which includes a value that is decreased by 1 every time the beacon frame is transmitted and that indicates a timing for handover of a master station function when the value becomes 0 until the handover of the master station function is executed and that corresponds to a timing for handover of the master station function between the master station and the candidate for the new master station, the beacon frame also including information indicating that the handover of the master station function is in progress, in order to notify other master stations belonging to other communication systems that the handover of the master station function is in progress, in a case where the response frame includes the information indicating the request is accepted.

2. A candidate for a new master station belonging to one of a plurality of communication systems, and having a non-transitory memory having stored therein a program executable by a processor, wherein each of the communication systems includes a master station and at least one slave station, and a candidate for a new master station is selected from the at least one slave station by the master station, the candidate for the new master station being programmed to operate as:
   a request frame receiving section configured to receive, from the master station, a request frame representing a request for the candidate for the new master station to become the new master station, in order to handover a master station function from the master station to the candidate for the new master station;

a response frame transmitting section configured to transmit, to the master station, a response frame including information indicating whether the request is accepted or not;

a beacon receiving section configured to periodically receive, from the master station, a first beacon frame which includes information including a value that is decreased by 1 every time the first beacon frame is transmitted and that indicates a timing for handover of the master station function when the value becomes 0 until the handover of the master station function is executed and that corresponds to a timing for handover of the master station function between the master station and the candidate for the new master station, the first beacon frame also including information indicating that the handover of the master station function is in progress, in order to notify other master stations belonging to other communication systems that the handover of the master station function is in progress, in a case where the response frame includes the information indicating the request is accepted; and a beacon transmitting section configured to periodically broadcast a second beacon frame which includes information indicating that the handover of the master station function is not in progress, in order to notify the other master stations belonging to the other communication systems that the handover of the master station function is not in progress after the handover of the master station function is executed.

3. A communication method used by a master station belonging to one of a plurality of communication systems, wherein each of the communication systems includes a master station and at least one slave station, the communication method comprising:

transmitting, to a candidate for a new master station selected from the at least one slave station, a request frame for representing a request for the candidate for the new master station to become the new master station, in order to handover a master station function to the candidate for the new master station;

receiving, from the candidate for the new master station, a response frame including information indicating whether the request is accepted or not; and periodically broadcasting a beacon frame which includes a value that is decreased by 1 every time the beacon frame is transmitted and that indicates a timing for handover of the master station function when the value becomes 0 until the handover of the master station function is executed and that corresponds the timing for handover of the master station function between the master station and the candidate for the new master station, the beacon frame also including information indicating that the handover of the master station function is in progress, in order to notify other master stations belonging to other communication systems that the handover of the master station function is in progress, in a case where the response frame includes the information indicating the request is accepted.

4. A communication method used by a candidate for a new master station belonging to one of a plurality of communication systems, wherein each of the communication systems includes a master station and at least one slave station, and the candidate for the new master station is selected from the at least one slave station by the master station, the communication method comprising:

receiving, from the master station, a request frame representing a request for the candidate for the new master station to become the new master station, in order to handover a master station function from the master station to the candidate for the new master station;

transmitting, to the master station, a response frame including information indicating whether the request is accepted or not;

periodically receiving, from the master station, a first beacon frame which includes information including a value that is decreased by 1 every time the first beacon frame is transmitted and that indicates a timing for handover of the master station function when the value becomes 0 until the handover of the master station function is executed and that corresponds to the timing for handover of the master station function between the master station and the candidate for the new master station, the first beacon frame also including information indicating that the handover of the master station function is in progress, in order to notify other master stations belonging to other communication systems that the handover of the master station function is in progress, in a case where the response frame includes the information indicating the request is accepted; and periodically broadcasting a second beacon frame which includes information indicating that the handover of the master station function is not in progress, in order to notify the other master stations belonging to the other communication systems that the handover of the master station function is not in progress after the handover of the master station function is executed.

* * * * *